United States Patent
Kitazato

(10) Patent No.: US 10,547,881 B2
(45) Date of Patent: Jan. 28, 2020

(54) TRANSMISSION DEVICE AND TRANSMISSION METHOD AS WELL AS RECEPTION DEVICE AND RECEPTION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/739,180

(22) PCT Filed: May 10, 2016

(86) PCT No.: PCT/JP2016/063857
§ 371 (c)(1),
(2) Date: Dec. 22, 2017

(87) PCT Pub. No.: WO2017/002455
PCT Pub. Date: Jan. 5, 2017

(65) Prior Publication Data
US 2018/0192084 A1    Jul. 5, 2018

(30) Foreign Application Priority Data
Jul. 1, 2015   (JP) ................................. 2015-132324

(51) Int. Cl.
*H04N 21/236*   (2011.01)
*H04N 21/231*   (2011.01)
(Continued)

(52) U.S. Cl.
CPC ........... *H04N 21/236* (2013.01); *G06F 16/13* (2019.01); *H04N 21/238* (2013.01);
(Continued)

(58) Field of Classification Search
CPC ........... H04N 21/236; H04N 21/23106; H04N 21/234309; H04N 21/238; H04N 21/278;
(Continued)

(56) References Cited

U.S. PATENT DOCUMENTS

2004/0060068 A1* 3/2004 Barbier ............ H04N 21/23617
725/109
2012/0185907 A1* 7/2012 Park ..................... H04N 21/236
725/110
(Continued)

FOREIGN PATENT DOCUMENTS

| JP | 2014-200054 A | 10/2014 |
| JP | 2014-204384 A | 10/2014 |
| JP | 5725242 B1 | 5/2015 |

OTHER PUBLICATIONS

"Recommendation ITU-R BT.2074-0 (May 2015) Service configuration, media transport protocol, and signaling information for MMT-based broadcasting systems," ITU-R Radiocommunication Sector of ITU, <URL: http://www.itu.int/dms_pubrec/itu-r/rec/bt/R-REC-BT.2074-0-201506-IIIPDF-E.pdf>, May 2015, (25 pages).
(Continued)

*Primary Examiner* — Randy A Flynn
(74) *Attorney, Agent, or Firm* — Oblon, McClelland, Maier & Neustadt, L.L.P.

(57) ABSTRACT

To reduce the transport amount of MMT data transport control signaling.
Detailed information regarding files under a directory agreeing with an MPU, is not transported in a DDMT, and detailed information regarding items under the MPU agreeing with the directory is not transported in a DAMT. A file describing the detailed information regarding the items under the MPU agreeing with the directory, is described as one item and is passed to the MPU so that transport is performed. In addition, an MPU node descriptor indicating
(Continued)

DIGITAL BROADCAST SYSTEM 10 that the MPU agrees with the directory, is arranged into the DAMT so that matching with the directory is performed.

20 Claims, 28 Drawing Sheets

(51) Int. Cl.
  *H04N 21/2343* (2011.01)
  *H04N 21/238* (2011.01)
  *H04N 21/278* (2011.01)
  *H04N 21/643* (2011.01)
  *H04N 21/854* (2011.01)
  *G06F 16/13* (2019.01)

(52) U.S. Cl.
  CPC .............. *H04N 21/23106* (2013.01); *H04N 21/234309* (2013.01); *H04N 21/278* (2013.01); *H04N 21/64322* (2013.01); *H04N 21/854* (2013.01)

(58) Field of Classification Search
  CPC .............. H04N 21/434; H04N 21/438; H04N 21/64322; H04N 21/854; G06F 13/00; G06F 17/30091
  See application file for complete search history.

(56) References Cited

U.S. PATENT DOCUMENTS

| | | | | |
|---|---|---|---|---|
| 2014/0007172 A1* | 1/2014 | Rhyu | ................. | H04N 21/2362 725/109 |
| 2014/0314157 A1* | 10/2014 | Hwang | ................ | H04N 21/236 375/240.27 |
| 2015/0085735 A1* | 3/2015 | Shelby | ............... | H04N 21/6125 370/312 |
| 2015/0150055 A1* | 5/2015 | Hwang | ................ | H04N 21/235 725/54 |

OTHER PUBLICATIONS

"ARIB STD-B60 Ver.1.2 MMT-Based Media Transport Scheme in Digital Broadcasting Systems," Association of Radio Industries and Businesses, <URL: http://arb.or.jp/english/html/overview/doc/2-STD-B60v1_2.pdf>, Ver.1.2, Mar. 17, 2015, (38 pages) (with English translation).

International Search Report dated Jul. 19, 2016 in PCT/JP2016/063857 filed May 10, 2016.

* cited by examiner

FIG. 7

MP TABLE 700

| DATA STRUCTURE | BIT LENGTH | DATA NOTATION |
|---|---|---|
| MMT_Package_Table () { | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for (i=0; i<N; i++) { | | |
|         MMT_package_id_byte | 8 | uimisbf |
|     } | | |
|     MPT_descriptors_length | 16 | uimsbf |
|     for (i=0; i<N; i++) { | | |
|         MPT_descriptor_byte | 8 | uimsbf |
|     } | | |
|     number_of_assets | 8 | uimsbf |
|     for (i=0; i<N; i++) { | | |
|         identifier_type | 8 | uimsbf |
|         asset_id_scheme | 32 | uimsbf |
|         asset_id_length | 8 | uimsbf |
|         for (i=0; i<N; i++) { | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for (j=0; j<M; j++) { | | |
|             MMT_general_location_info () | | |
|         } | | |
|         asset_descriptors_length | 16 | uimsbf |
|         for (j=0; j<M; j++) { | | |
|             asset_descriptors_byte | 8 | bslbf |
|         } | | |
|     } | | |
| } | | |

FIG. 8

MH-AIT 800 

| DATA STRUCTURE | BIT LENGTH | DATA NOTATION |
|---|---|---|
| MH-Applicatin_Information_Table() { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptor_length | 12 | uimsbf |
|     for(i=0; i<N; i++){ | | |
|         descriptor () | | |
|     } | | |
|     reserved_future_use | 4 | bslbf |
|     application_loop_length | 12 | uimsbf |
|     for(i=0; i<N; i++){ | | |
|         application_identifier () | | |
|         application_control_code | 8 | uimsbf |
|         reserved_future_use | 4 | bslbf |
|         application_descriptor_loop_length  801 | 12 | uimsbf |
|         for (j=0; j<M; j++) { | | |
|             descriptor () | | |
|         } | | |
|     } | | |
|     CRC32 | 32 | rpchof |
| } | | |

TRANSPORT PROTOCOL DESCRIPTOR 900

| DATA STRUCTURE | BIT LENGTH | DATA NOTATION |
|---|---|---|
| transport_protocol_descriptor() { | | |
|     descriptor_tag | 16 | uimsbf |
|     descriptor_length | 8 | uimsbf |
|     protocol_id | 16 | uimsbf |
|     transport_protocol_label | 8 | uimsbf |
|     for(i=0;i<N;i++){ | | |
|         selector_byte | 8 | uimsbf |
|     } | | |
| } | | |

FIG. 10

SELECTOR BYTE 1000

| DATA STRUCTURE | BIT LENGTH | DATA NOTATION |
|---|---|---|
| for(i=0;i<N;i++) { | | |
|     URL_base_length | 8 | uimsbf |
|     for(j=0;j<N;j++){ | | |
|         URL_base_byte | 8 | uimsbf |
|     } | | |
|     URL_extension_count | 8 | uimsbf |
|     for(j=0;j<URL_extension_count;j++){ | | |
|         URL_extension_length | 8 | uimsbf |
|         for(k=0;k<URL_extension_length;k++){ | | |
|             URL_extension_byte | 8 | uimsbf |
|         } | | |
|     } | | |
| } | | |

FIG. 11

DATA DIRECTORY MANAGEMENT TABLE 1100

| DATA STRUCTURE | BIT LENGTH | DATA NOTATION |
|---|---|---|
| Data_Directory_Management_table () { | | |
|     table_id | 8 | uimsbf |
|     version | 8 | uimsbf |
|     length | 16 | uimsbf |
|     base_directory_path_length | 8 | uimsbf |
|     for (i=o; i<base_directory_path_length; i++){ | | |
|         base_directory_path_byte | 8 | uimsbf |
|     } | | |
|     num_of_directory_nodes | 16 | uimsbf |
|     for(i=0; i<num_of_directory_nodes; i++){ | | |
|         node_tag | 16 | uimsbf |
|         directory_node_version | 8 | uimsbf |
|         directory_node_path_length | 8 | uimsbf |
|         for(j=0; j<directory_node_path_length; j++){ | | |
|             directory_node_path_byte | 8 | char |
|         } | | |
|         num_of_files | 16 | uimsbf |
|         for(j=0; j<num_of_files; j++){ | | |
| 1101            node_tag | 16 | uimsbf |
|             file_name_length | 8 | uimsbf |
|             for(k=0; k<file_name_length; k++){ | | |
|                 file_name_byte | 8 | char |
|             } | | |
|         } | | |
|     } | | |
| } | | |

FIG. 12

DATA ASSET MANAGEMENT TABLE 1200

| DATA STRUCTURE | BIT LENGTH | DATA NOTATION |
|---|---|---|
| Data_Asset_Management_Table() { | | |
|     table_id | 8 | uimsbf |
|     version | 8 | uimsbf |
|     length | 16 | uimsbf |
|     number_of_data_components | 8 | uimsbf |
|     for(i=0; i<number_of_data_components; i++){ | | |
|         transaction_id | 32 | uimsbf |
|         component_tag | 16 | uimsbf |
|         download_id | 32 | uimsbf |
|         num_of_mpus | 8 | uimsbf |
|         for(j=0; j<num_of_mpus; j++){ | | |
|             mpu_sequence_number | 32 | uimsbf |
|             num_of_items | 8 | uimsbf |
|             for (k=0; k<num_of_items; k++){ | | |
|                 item_id | 32 | uimsbf |
|                 node_tag | 16 | uimsbf |
|                 item_size | 32 | uimsbf |
|                 item_version | 8 | uimsbf |
|                 checksum_flag | 1 | bslbf |
|                 reserved_future_flag | 7 | bslbf |
|                 if (checksum_flag==1){ | | |
|                     item_check_sum | 32 | uimsbf |
|                 } | | |
|                 item_info_length | 8 | uimsbf |
|                 for(l=0; l<item_info_length; l++){ | | |
|                     item_info_byte | 8 | uimsbf |
|                 } | | |
|                 mpu_info_length | 8 | uimsbf |
|             for (m=0; m<mpu_info_length; m++){ | | |
|                 mpu_info_byte | 8 | uimsbf |
|             } | | |
|         } | | |
|         descriptor_loop_length | 8 | uimsbf |
|         for(n=0; n<N; n++){ | | |
|             descriptor() | | |
|         } | 16 | uimsbf |
|     } | | |
| } | | |

FIG. 16

DU_Header OF MFU INCLUDING NON-TIMED MEDIA ARRANGED 1600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            item_id                            |
+-+-+-+-+-+-+-+-+-+-+-+-+-+-+-+-+-+-+-+-+-+-+-+-+-+-+-+-+-+-+-+-+
```

MPU NODE DESCRIPTOR 1800

| DATA STRUCTURE | BIT LENGTH | DATA NOTATION |
|---|---|---|
| MPU_node_descriptor () { | | |
|     descriptor_tag | 16 | uimsbf |
|     descriptor_length | 8 | uimsbf |
|     node_tag | 8 | uimsbf |
|     index_item_exist_flag | 1 | bslbf |
|     index_item_id_flag | 1 | bslbf |
|     if (index_item_exist_flag==1&index_item_id_flag=1) { | | |
|         index_item_id | 32 | uimsbf |
| } | | |

FIG. 19 index_item 1900

| DATA STRUCTURE | BIT LENGTH | DATA NOTATION |
|---|---|---|
| index_item () { | | |
|     num_of_items | 8 | uimsbf |
|     for (i=0; i<num_of_items; i++) | | |
|         item_id | 32 | uimsbf |
|         item_size | 32 | uimsbf |
|         file_name_length | 8 | uimsbf |
|         for (j=0; j<file_name_length; j++) | | |
|             file_name_byte | | char |
|         } | | |
|         checksum_flag | 1 | bslbf |
|         reserved_future_use | 7 | bslbf |
|         if (checksum_flag==1) { | | |
|             item_checksum | 32 | uimsbf |
|         } | | |
|         item_type_length | 8 | uimsbf |
|         for (k=0; k<item_type_length; k++) { | | |
|             text_char | 8 | uimsbf |
|         } | | |
|         compression_type | 16 | uimsbf |
|         if (compression_type ≠ 0xFF) { | | |
|             original_size | 32 | uimsbf |
|         } | | |
|     } | | |
| } | | |

FIG. 24

DATA ASSET MANAGEMENT TABLE 2400

| DATA STRUCTURE | BIT LENGTH | DATA NOTATION |
|---|---|---|
| Data_Asset_Management_Table() { | | |
|     table_id | 8 | uimsbf |
|     version | 8 | uimsbf |
|     length | 16 | uimsbf |
|     number_of_data_components | 8 | uimsbf |
|     for(i=0; i<number_of_data_components; i++){ | | |
|         transaction_id | 32 | uimsbf |
|         component_tag | 16 | uimsbf |
|         download_id | 32 | uimsbf |
|         num_of_mpus | 8 | uimsbf |
|         for(j=0; j<num_of_mpus; j++){ | | |
|             mpu_sequence_number | 32 | uimsbf |
| 2401             <u>index_item_exist_flag</u> | 1 | bslbf |
| 2402             <u>index_item_id_flag</u> | 1 | bslbf |
|             if (index_item_exist_flag==1&index_item_id_flag==1) { | | |
| 2403                 <u>index_item_id</u> | 32 | uimsbf |
|             } | | |
|             num_of_items | 8 | uimsbf |
|             for (k=0; k≤num_of_items; k++){ | | |
|                 if (index_item_exist_flag==0) { | | |
| 2404                   item_id | 32 | uimsbf |
|                   node_tag | 16 | uimsbf |
|                   item_size | 32 | uimsbf |
|                   item_version | 8 | uimsbf |
|                   checksum_flag | 1 | bslbf |
|                   reserved_future_flag | 7 | bslbf |
|                 if (checksum_flag==1){ | | |
|                     item_check_sum | 32 | uimsbf |
|                 } | | |
|                 item_info_length | 8 | uimsbf |
|                 for(l=0; l<item_info_length; l++){ | | |
|                     item_info_byte | 8 | uimsbf |
|                 } | | |
|             } | | |
|             mpu_info_length | 8 | uimsbf |
|             for (m=0; m<mpu_info_length; m++){ | | |
| 2405                 <u>mpu_info_byte</u> | 8 | uimsbf |
|             } | | |
|         } | | |
|         descriptor_loop_length | 8 | uimsbf |
|         for(n=0; n<N; n++){ | | |
|            descriptor() | | |
|         } | 16 | uimsbf |
|     } | | |
| } | | |

FIG. 25

MPU NODE DESCRIPTOR 2500

| DATA STRUCTURE | BIT LENGTH | DATA NOTATION |
|---|---|---|
| MPU_node_descriptor () {  <br>    descriptor_tag  <br>    descriptor_length  <br>    node_tag  <br>} | <br>16<br>8<br>8 | <br>uimsbf<br>uimsbf<br>uimsbf |

*FIG. 26* index_item 2600

| DATA STRUCTURE | BIT LENGTH | DATA NOTATION |
|---|---|---|
| index_item () { | | |
|     num_of_items | 8 | uimsbf |
|     for (i=0; i<num_of_items; i++) | | |
|         item_id | 32 | uimsbf |
|         node_tag | 16 | uimsbf |
|         item_size | 32 | uimsbf |
|         file_name_length | 8 | uimsbf |
|         for (j=0; j<file_name_length; j++) | | |
|             file_name_byte | | char |
|         } | | |
|         checksum_flag | 1 | bslbf |
|         reserved_future_use | 7 | bslbf |
|         if (checksum_flag==1) { | | |
|             item_checksum | 32 | uimsbf |
|         } | | |
|         item_type_length | 8 | uimsbf |
|         for (k=0; k<item_type_length; k++) { | | |
|             text_char | 8 | uimsbf |
|         } | | |
|         compression_type | 16 | uimsbf |
|         if (compression_type ≠ 0xFF) { | | |
|             original_size | 32 | uimsbf |
|         } | | |
|     } | | |
| } | | |

2601 → node_tag

TRANSMISSION DEVICE AND TRANSMISSION METHOD AS WELL AS RECEPTION DEVICE AND RECEPTION METHOD

TECHNICAL FIELD

The technology disclosed in the present specification relates to a transmission device and a transmission method that transmit files included in data broadcasting together with transport control information of the data broadcasting, and a reception device and a reception method that receive the files included in the data broadcasting together with the transport control information of the data broadcasting.

BACKGROUND ART

Change from MPEG2-TS to a MPEG media transport (MMT) format, has been considered in the next-generation digital broadcast standards (e.g., refer to Patent Document 1). A combination of different transport lines is easily used in the MMT format, and thus a broadcast transport line and a communication transport line can be used in common.

A broadcast signal includes timed media, such as video, audio, and subtitles, relating to a main body of a broadcast program, and non-timed media, such as file data, used for data broadcasting accompanied with the broadcast program. In a broadcast system using the MMT format, media data in which the timed media and the non-timed media have been encoded, is converted into the format of a transport unit being a media processing unit (MPU) so as to be MMT-protocol (MMTP)-packetized. Furthermore, the MMTP packets are disposed on internet protocol (IP) packets so as to be transported. In addition, the IP packets are transported in the format of a type value length (TLV) packet in the broadcast transport line (e.g., refer to Patent Document 2).

In a case where content of the data broadcasting is transported with a broadcast wave, transport of data transport control information of the content, namely, signaling is additionally performed. The current MMT broadcast standards prescribe that signaling is individually performed to the directory configuration of the content in production and the configuration of the broadcast transport data. Therefore, there is provided the flexibility of being able to independently manage the production of the content and the configuration of the broadcast transport data.

CITATION LIST

Patent Document

Patent Document 1: Japanese Patent Application Laid-Open No. 2014-200054
Patent Document 2: Japanese Patent Application Laid-Open No. 2014-204384

SUMMARY OF THE INVENTION

Problems to be Solved by the Invention

An object of the technology disclosed in the present specification is to provide a superior transmission device and transmission method that can favorably transmit files included in data broadcasting and transport control information of the data broadcasting.

Another object of the technology disclosed in the present specification is to provide a superior reception device and reception method that can favorably receive the files included in the data broadcasting and the transport control information of the data broadcasting.

Solutions to Problems

The technology disclosed in the present specification has been made in consideration of the above problems. According to a first aspect thereof, a transmission device includes: a transmission unit configured to transmit a transport unit including a set of items used for file transport; and a control information transmission unit configured to transmit transport control information including a first table and a second table, the first table describing first information relating to files per directory, the second table describing second information relating to the items per transport unit. In a case where the transmission unit transmits the transport unit agreeing with a directory, the control information transmission unit transmits the first table and the second table, the first table having omitted the first information under the directory agreeing with the transport unit, the second table having omitted the second information under the transport unit agreeing with the directory, and the transmission unit includes an index item including a description relating to the first information and the second information that have been omitted, into the transport unit to perform the transmission.

According to a second aspect of the technology disclosed in the present specification, the control information transmission unit in the transmission device according to the first aspect arranges a descriptor indicating that the transport unit agrees with the directory, into the second table to transmit the transport control information.

According to a third aspect of the technology disclosed in the present specification, the control information transmission unit in the transmission device according to the second aspect, transmits the descriptor specifying node identification information, whether the index item is present, and item identification information of the index item, the node identification information identifying the directory agreeing with the transport unit.

According to a fourth aspect of the technology disclosed in the present specification, the transmission unit in the transmission device according to the first aspect, transmits the index item including item identification information per item under the transport unit agreeing with the directory, associated with a file name of the file transported with each of the items.

According to a fifth aspect of the technology disclosed in the present specification, the transmission unit in the transmission device according to the fourth aspect, transmits the index item further including size information of each of the items.

According to a sixth aspect of the technology disclosed in the present specification, the transmission unit in the transmission device according to the fourth aspect, transmits the index item further including checksum information of each of the items.

According to a seventh aspect of the technology disclosed in the present specification, the transmission unit in the transmission device according to the fourth aspect, transmits the index item further including type identification information specifying a media type of the file transported with each of the items.

According to an eighth aspect of the technology disclosed in the present specification, the transmission unit in the transmission device according to the fourth aspect, transmits the index item further including compression identification information specifying a compression algorithm and an original size, the compression algorithm being applied to each of the items.

In addition, according to a ninth aspect of the technology disclosed in the present specification, a transmission method includes: a transmission step of transmitting a transport unit including a set of items used for file transport; and a control information transmission step of transmitting transport control information including a first table and a second table, the first table describing first information relating to files per directory, the second table describing second information relating to the items per transport unit. In a case where the transport unit agreeing with a directory is transmitted at the transmission step, the first table and the second table are transmitted at the control information transmission step, the first table having omitted the first information under the directory agreeing with the transport unit, the second table having omitted the second information under the transport unit agreeing with the directory, and an index item including a description relating to the first information and the second information that have been omitted, is included into the transport unit to perform the transmission, at the transmission step.

In addition, according to a tenth aspect of the technology disclosed in the present specification, a reception device includes: a reception unit configured to receive a transport unit including a set of items used for file transport; a control information reception unit configured to receive transport control information including a first table and a second table, the first table describing first information relating to files per directory, the second table describing second information relating to the items per transport unit; and a processing unit configured to process the files transported with the items, on the basis of the transport control information. In a case where the transport unit agreeing with a directory is transported, the control information reception unit receives the first table and the second table, the first table having omitted the first information under the directory agreeing with the transport unit, the second table having omitted the second information under the transport unit agreeing with the directory, and the reception unit receives the transport unit including an index item including a description relating to the first information and the second information that have been omitted, and the processing unit acquires the files on the basis of the description of the index item.

According to an eleventh aspect of the technology disclosed in the present specification, the processing unit in the reception device according to the tenth aspect, caches, in entirety, the transport unit received by the reception unit, in response to the reception of the transport control information by the control information reception unit, the transport control information including a descriptor arranged in the second table, the descriptor indicating that the transport unit agrees with the directory.

According to a twelfth aspect of the technology disclosed in the present specification, the control information reception unit in the reception device according to the tenth aspect, receives the descriptor specifying node identification information, whether the index item is present, and item identification information of the index item, the node identification information identifying the directory agreeing with the transport unit.

According to a thirteenth aspect of the technology disclosed in the present specification, the processing unit in the reception device according to the twelfth aspect, acquires the index item on the basis of the item identification information specified by the descriptor from the transport unit received by the reception unit.

According to a fourteenth aspect of the technology disclosed in the present specification, the reception unit in the reception device according to the tenth aspect, receives the index item including item identification information per item under the transport unit agreeing with the directory, associated with a file name of the file transported with each of the items.

According to a fifteenth aspect of the technology disclosed in the present specification, the processing unit in the reception device according to the fourteenth aspect, specifies the item identification information used for the file transport, to acquire the item from the transport unit, on the basis of the index item.

According to a sixteenth aspect of the technology disclosed in the present specification, the reception unit in the reception device according to the fourteenth aspect, receives the index item further including size information of each of the items.

According to a seventeenth aspect of the technology disclosed in the present specification, the reception unit in the reception device according to the fourteenth aspect, receives the index item further including checksum information of each of the items.

According to an eighteenth aspect of the technology disclosed in the present specification, the reception unit in the reception device according to the fourteenth aspect, receives the index item further including type identification information specifying a media type of the file transported with each of the items.

According to a nineteenth aspect of the technology disclosed in the present specification, the reception unit in the reception device according to the fourteenth aspect, receives the index item further including compression identification information specifying a compression algorithm and an original size, the compression algorithm being applied to each of the items.

In addition, according to a twentieth aspect of the technology disclosed in the present specification, a reception method includes: a reception step of receiving a transport unit including a set of items used for file transport; a control information reception step of receiving transport control information including a first table and a second table, the first table describing first information relating to files per directory, the second table describing second information relating to the items per transport unit; and a processing step of processing the files transported with the items on the basis of the transport control information. In a case where the transport unit agreeing with a directory is transported, the first table and the second table are received at the control information reception step, the first table having omitted the first information under the directory agreeing with the transport unit, the second table having omitted the second information under the transport unit agreeing with the directory, and the transport unit including an index item is received at the reception step, the index item including a description relating to the first information and the second information that have been omitted, and the files are acquired on the basis of the description of the index item at the processing step.

Effects of the Invention

According to the technology disclosed in the present specification, there can be provided the superior transmission device and transmission method that can reduce and transport the transport control information of the data broadcasting in making a directory in content production agree with a transport unit in the data broadcasting.

According to the technology disclosed in the present specification, there can be provided the superior reception device and reception method that can effectively receive the files in which the directory in the content production agrees with the transport unit in the data broadcasting and can favorably receive the transport control information of the data broadcasting.

Note that the effects described in the present specification are just exemplifications, and thus the effects of the present invention are not limited to these. In addition, the present invention may further have additional effects other than the above effects.

The features, the advantages, and another different object of the technology disclosed in the present specification, will be clear with the embodiment to be described and the more detailed descriptions based on the attached drawings.

BRIEF DESCRIPTION OF DRAWINGS

FIG. 7 is a table of an exemplary syntax of the MP table 700.

FIG. 8 is a table of an exemplary syntax of an MH-AIT 800.

FIG. 10 is a table of an exemplary syntax of a selector byte 1000 in common between HTTP/HTTPS transport and MMT non-timed transport.

FIG. 11 is a table of an exemplary syntax of a data directory management table (DDMT) 1100.

FIG. 12 is a table of an exemplary syntax of a data asset management table (DAMT) 1200.

FIG. 16 is a diagram of an exemplary syntax of DU_Header 1600 stored in the MMTP payload 1500 in which the non-timed media has been arranged.

FIG. 19 is a table of an exemplary syntax of index_item 1900.

FIG. 24 is a table of a different exemplary syntax of the data asset management table (DAMT) 2400.

FIG. 25 is a table of an exemplary syntax of the MPU node descriptor 2500 used together with the data asset management table 2400 illustrated in FIG. 24.

FIG. 26 is a table of an exemplary syntax of the index_item 2600 used together with the data asset management table 2400 illustrated in FIG. 24.

MODE FOR CARRYING OUT THE INVENTION

An embodiment of the technology disclosed in the present specification, will be described in detail below with reference to the drawings.

A. System Configuration

Figure 1:
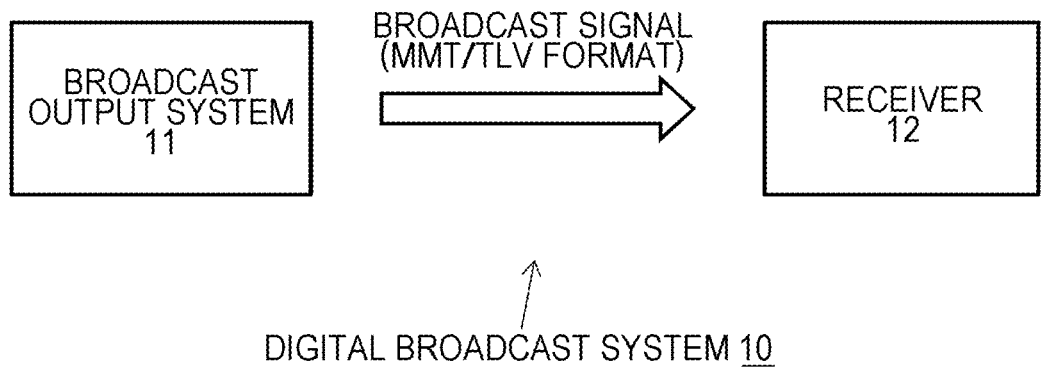
FIG. 1 is a diagram of a schematic exemplary configuration of a digital broadcast system 10.

FIG. 1 schematically illustrates an exemplary configuration of a digital broadcast system 10. The illustrated digital broadcast system 10 includes a broadcast output system 11 and a receiver 12.

The broadcast output system 11 applies an MMT format to transport of a broadcast signal, and internet-protocol (IP)-packetizes and transports each component included in a broadcast service. Specifically, the broadcast output system 11 disposes the codes of a video signal and an audio signal in a broadcast program together with signals, such as content and subtitles, onto MMT protocol (MMTP) payloads so as to perform MMTP packetization and furthermore IP packetization so that the transport is performed in a type length value (TLV) packet format in a broadcast transport line. Here, the components, such as video, audio, and the subtitles, relating to a main body of the broadcast program, are timed media. The content is non-timed media including an application that provides a multimedia service (e.g., an HTML5 document), and files, such as image data and audio data, used by the application.

In addition, the broadcast output system 11 performs signaling (notification) of MMT-SI being control information relating to the broadcast service that transports the timed and non-timed media. The MMT-SI includes messages, tables, and descriptors. The tables are transported by the messages each as a container. Part of parameters indicated with the messages and the tables are described in a descriptor format.

Meanwhile, the receiver 12 receives the TLV packets transmitted from the broadcast output system 11 through the broadcast transport line. The receiver 12, then, the receiver 12 decodes the timed transport media, such as the video, the audio, and the subtitles, included in the broadcast program from the reception packets so as to present the image, the audio, and the subtitles. In addition, when acquiring each data file for data broadcasting from the reception packets, the receiver 12 starts an application engine, such as an HTML browser, so as to display the data broadcasting operating together with the broadcast program, onto a partial area or the entire area of a screen on which the video of a TV program is displayed.

In addition, the receiver 12 also receives the MMT-SI being the control information relating to the broadcast service. On the basis of the MMT-SI, the receiver 12 performs reception control of the transport media, such as the video, the audio, the subtitles, and the data broadcasting, and output (display and audio output) control on the receiver 12.

Figure 2:
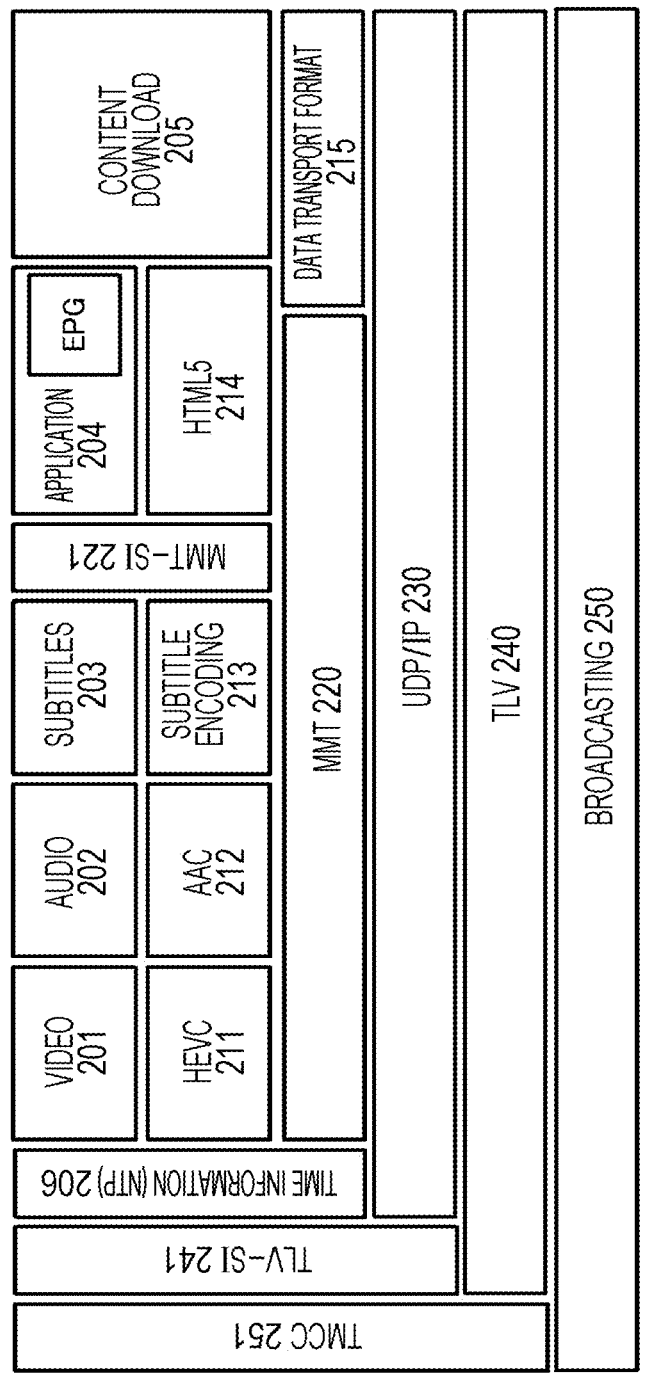
FIG. 2 is a diagram of a protocol stack 200 in the digital broadcast system 10 using an MMT format.

FIG. 2 illustrates a protocol stack 200 in the digital broadcast system 10 using the MMT format.

One broadcast service includes the respective components of video 201, audio 202, subtitles 203, an application 204, and content download 205. Encoding 211 in a high efficiency video coding (HEVC) format is performed to the video 201, encoding 212 in an advanced audio coding (AAC) format is performed to the audio 202, and subtitle encoding 213 is performed to the subtitles 203. In addition, the application 204 includes an electric program guide (EPG), and is encoded, for example, in an HTML5 format as indicated with reference numeral 214.

On an MMT layer 220, the encoded components 211 and 212 of the video signal and the audio signal in the broadcast program, are converted into media fragment units (MFUs) and MPUs so as to be disposed on MMTP payloads so that MMTP packetization is performed. Here, an MPU is a transport unit, and an MFU is a unit smaller than the MPU. In addition, the encoded component 213 of the subtitle signal and the HTML5 encoded component 214 of the application, are also converted into MFUs and MPUs so as to be disposed on MMTP payloads so that MMTP packetization is performed. In addition, as indicated with reference numeral 221, the MMT-SI being the control information (indicating the configuration of the broadcast program) relating to the MMT in a media transport format, is also disposed on an MMTP payload so that MMTP packetization is performed. The details of the control information MMT-SI relating to the MMT, will be described later.

Examples of a data transport format 215 of the content download 205, include four types: a subtitle/character super transport format, an application transport format, an event message transport format, and a general-purpose data transport format. The application transport format among the formats, is used for the broadcast program and a non-timed data transport service. In addition, the general-purpose transport format is a format of making various types of data timed or non-timed to transport the various types of data, and can be applied to streaming of data used in a player that presents data except the video, the audio, and the subtitles, or streaming of data used in the multimedia service.

The MMTP packets are IP-packetized in a user datagram protocol (UDP)/IP layer 530. In addition, a network time protocol (NTP) packet 206 including information regarding the current time for the timed media, is also IP-packetized. Furthermore, the IP packets are TLV-packetized in a TLV layer 240 so as to be transported through a broadcast transport line 250 being a physical layer of the bottom layer. In addition, TLV-SI, indicated with reference numeral 241, relating to a TLV multiplexing format of multiplexing the IP packets, is also TLV-packetized so as to be transported through the broadcast transport line 250. A transport slot including the TLV packets multiplexed, is specified with a TLV stream identifier (TLV_stream_id) from a transmission and multiplexing configuration control (TMCC) signal 251 of the transport line.

Figure 3:
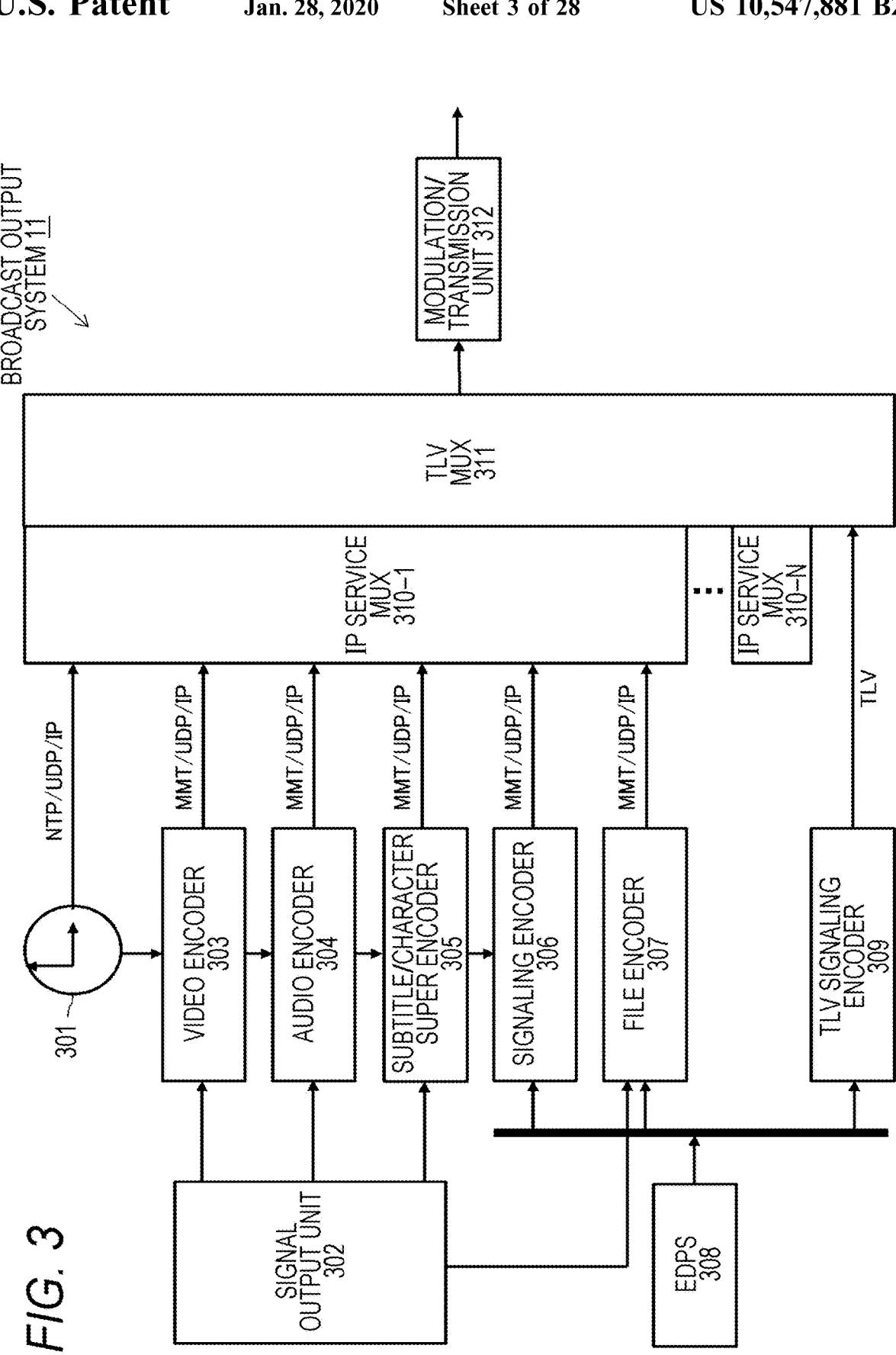
FIG. 3 is a diagram of an exemplary configuration of a broadcast output system 11.

FIG. 3 illustrates an exemplary configuration of the broadcast output system 11 that transmits the broadcast signal having the protocol stack structure illustrated in FIG. 2. The illustrated broadcast output system 11 includes a clock unit 301, a signal output unit 302, a video encoder 303, an audio encoder 304, a subtitle/character super encoder 305, a signaling encoder 306, a file encoder 307, an electronic data processing system (EDPS) 308, a TLV signaling encoder 309, an IP service multiplexer (MUX) 310, a TLV multiplexer (MUX) 311, and a modulation/transmission unit 312.

The signal output unit 302 corresponds to, for example, a recorder/reproducer for a studio in a TV broadcast station or VTR, and sends stream data, such as the video, the audio, and the subtitles and character supers, included in the timed media, to the video encoder 303, the audio encoder 304, the subtitle/character super encoder 305, respectively. In addition, the signal output unit 302 sends the content included in the non-timed media and the timed and non-timed general-purpose data, to the file encoder 307.

The electronic data processing system. 308 includes the supply of a scheduler and files of the TV broadcast station. The electronic data processing system 308 sends the content included in the non-timed media and the timed and non-timed general-purpose data, to the file encoder 307. In addition, the electronic data processing system 308 sends the control information indicating, for example, the configuration of the broadcast service, to the signaling encoder 306. In addition, the electronic data processing system 308 sends control information relating to the multiplexing of the IP packets, to the TLV signaling encoder 309.

The video encoder 303 HEVC-encodes and further packetizes the video signal output from the signal output unit 302, so as to send the IP packets including the MMT packets of the video signal, to the IP service multiplexer 310. In addition, the audio encoder 304 AAC-encodes and further packetizes the audio signal output from the signal output unit 302, so as to send the IP packets including the MMT packets of the audio signal, to the IP service multiplexer 310. In addition, the subtitle/character super encoder 305 encodes the subtitle signal and character super signal output from the signal output unit 302 and further generates MPUs in units of presentation processing, so as to send the IP packets including the MMT packets of the subtitles to the IP service multiplexer 310.

In a case where the broadcast output system 11 transmits a plurality of broadcast services (namely, the components of a plurality of broadcast channels), HEVC encoding processing of a video signal, AAC encoding processing of an audio signal, and encoding processing of subtitles/character supers are performed per broadcast service, so that transmission is performed to IP service multiplexers 310-1 to 310-N corresponding to the broadcast services #1 to #N, respectively.

On the basis of the information output from the electronic data processing system 308, the signaling encoder 306 generates the control information (MMT-SI) indicating, for example, the configuration of the broadcast signal, and sends an IP packet including the MMT packet including the MMT-SI arranged in the payload portion, to the IP service multiplexer 310. The MMT-SI includes the messages, the tables, and the descriptors (as described above). The signaling encoder 306 generates MMT-SI on broadcast service traverse in addition to generating the MMT-SI per broadcast service.

The file encoder 307 encodes and further packetizes the content and the general-purpose data output from the signal output unit 302 or the electronic data processing system 308, so as to send the IP packets including the MMT packets to the IP service multiplexer 310.

The broadcast output system 11 includes the plurality of IP service multiplexers 310-1 to 310-N for the broadcast services (the broadcast channels) #1 to #N to be output, respectively. The IP service multiplexer 310 for the channel per broadcast service, multiplexes the respective IP packets including the video, the audio, the subtitles, the MMT-SI (per broadcast service), the content, and the general purpose data, sent from the encoders 303 to 307, so as to generate the TLV packets including the broadcast signal per broadcast service and the MMT-SI on the broadcast service traverse.

On the basis of the information output from the electronic data processing system 308, the TLV signaling encoder 309 generates a TLV packet including the control information (TLV-SI) relating to the multiplexing of the IP packets, arranged in a payload portion.

The TLV multiplexer 311 multiplexes the respective TLV packets generated by the IP service multiplexers 310-1 to 310-N and the TLV signaling encoder 309, so as to generate a TLV stream identified with the TLV stream identifier.

The modulation/transmission unit 312 performs RF modulation processing to the TLV stream generated by the TLV multiplexer 311 so as to make an output to the broadcast transport line.

The operation of the broadcast output system 11 illustrated in FIG. 3, will be described.

The video signal output from the signal output unit 302 is supplied to the video encoder 303. The video encoder 303 HEVC-encodes and further packetizes the video signal, so as to generate the IP packets including the MMT packets of the HEVC encoded video signal. The IP packets are sent to the IP service multiplexer 310.

In addition, similar processing is performed to the audio signal and the subtitle and character super signals output from the signal output unit 302. That is, the IP packets including the MMT packets of the AAC encoded audio signal generated by the audio encoder 304, are sent to the IP service multiplexer 310, and additionally the IP packets including the MMT packets of the subtitle encoded signal generated by the subtitle/character super encoder 305, are sent to the IP service multiplexer 310.

In addition, on the basis of the information output from the electronic data processing system 308, the signaling encoder 306 generates the control information (MMT-SI) indicating, for example, the configuration of the broadcast signal, and generates the IP packet including the MMT packet including the MMT-SI arranged in the payload portion. The IP packets are sent to the IP service multiplexer 310.

In addition, the content and the general-purpose data output from the signal output unit 302 or the electronic data processing system 308, are supplied to the file encoder 307. The file encoder 307 encodes and further packetizes the content and the general-purpose data, so as to generate the IP packets including the MMT packets. The IP packets are sent to the IP service multiplexer 310.

Each of the IP service multiplexers 310-1 to 310-N, multiplexes the respective IP packets including the video, the audio, the subtitles, the MMT-SI (per broadcast service and the service traverse), the content, and the general-purpose data sent from the encoders 303 to 307, so as to generate the TLV packets included in one channel.

On the basis of the information output from the electronic data processing system 308, the TLV signaling encoder 309 generates the TLV packet including the control information (TLV-SI) relating to the multiplexing of the IP packets, arranged in the payload portion.

The TLV multiplexer 311 multiplexes the TLV packets generated by the IP service multiplexers 310-1 to 310-N and the TLV signaling encoder 309, so as to generate the TLV stream. The modulation/transmission unit 312 performs the RF modulation processing to the TLV stream generated by the TLV multiplexer 311 so as to output the RF modulated signal to the broadcast transport line.

Figure 4:
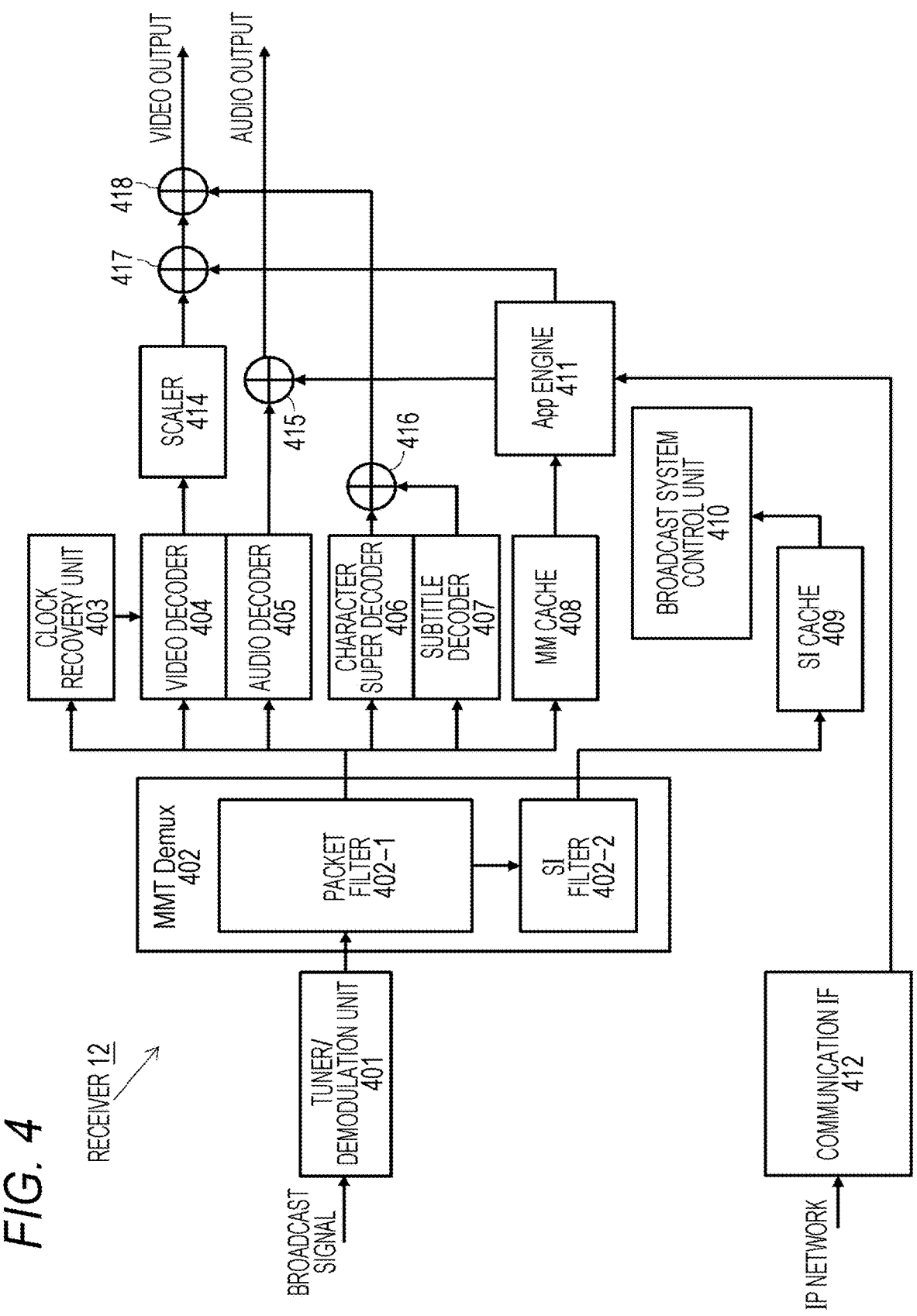
FIG. 4 is a diagram of an exemplary configuration of a receiver 12 that receives a broadcast signal from the broadcast output system 11.

FIG. 4 illustrates an exemplary configuration of the receiver 12 that receives the broadcast signal from the broadcast output system 11. The illustrated receiver 12 includes a tuner/demodulation unit 401, an MMT demultiplexer (DEMUX) 402, a clock recovery unit 403, a video decoder 404, an audio decoder 405, a character super decoder 406, a subtitle decoder 407, a multimedia (MM) cache 408, an SI cache 409, a broadcast system control unit 410, an application (App) engine 411, a communication interface (IF) 412, a scaler 414, and composition units 415 to 418.

The tuner/demodulation unit 401 selectively receives the broadcast signal, and performs demodulation processing so as to acquire the TLV stream. The MMT demultiplexer 402 performs demultiplexing processing and depacketization processing to the TLV stream. The demultiplexer 402 includes a packet filter 402-1 and an SI filter 402-2.

The packet filter 402-1 performs filtering to the IP packets on the basis of the TLV stream identifier and an IP address, and further performs filtering to the MMTP packets from the IP packets on the basis of information in MMTP headers, so as to individually allocate the timed transport media, such as the video, the audio, the character supers, and the subtitles, to the video decoder 404, the audio decoder 405, the character super decoder 406, and the subtitle decoder 407.

In addition, the packet filter 402-1 allocates the respective encoded components of the content and the general-purpose data, to the multimedia (MM) cache 408.

In addition, the packet filter 402-1 allocates the MMTP packet including the signaling information disposed, to the SI filter 402-2. Then, the SI filter 402-2 performs filtering to the signaling information SI so as to cache the signaling information SI into the SI cache 409.

On the basis of the information regarding the current time included in the NTP packet to which the packet filter 402-1 in the MMT demultiplexer 402 has performed filtering, the clock recovery unit 403 generates time information synchronized with the information regarding the current time, so as to output the time information to each of the video decoder 404, the audio decoder 405, the character super decoder 406, and the subtitle decoder 407 in order to decode each in the timed transport media.

The video decoder 404 decodes the encoded video signal acquired by the MMT demultiplexer 402, so as to acquire the video signal in a baseband. In addition, the audio decoder 405 decodes the encoded audio signal acquired by the MMT demultiplexer 402, so as to acquire the audio signal in the baseband. In addition, the character super decoder 406 and the subtitle decoder 407 decode the encoded character super signal and the subtitle encoded signal acquired by the MMT demultiplexer 402, respectively, so as to acquire the character super display signal and the subtitle display signal, respectively.

The broadcast system control unit 410 controls the entire broadcast service reception operation of the receiver 12 on the basis of the MMT-SI cached in the SI cache 409. For example, when analyzing execution control information (MH-AIT) on applications included in the MMT-SI and finding the application instructed to start, the broadcast system control unit 410 instructs the application engine 411 on presentation processing of the data broadcasting.

The application engine 411 includes, for example, the HTML browser, and performs processing of the application (e.g., an HTML5 document) cached in the multimedia cache 408 so as to generate the display signal and the audio signal of the data broadcasting. In addition, the application engine 411 can acquire data files necessary for displaying the data broadcasting (e.g., media data used to display the data broadcasting and an application of a link destination) from an IP network through the communication interface 412.

The scaler 414 performs scaling processing to the video signal (broadcast video) decoded by the video decoder 404, in accordance with the screen size of the receiver 12.

The composition unit 415 composites the audio signal decoded by the audio decoder 405 and the audio signal for the data broadcasting reproduced by the application engine 411, so as to generate the audio signal for output.

The composition unit 416 composites the character super display decoded by the character super decoder 406 and the subtitle display decoded by the subtitle decoder 407. In addition, the composition unit 417 composites the broadcast video to which the scaler 414 has performed the scaling processing, and the display signal of the data broadcasting generated by the application engine 411. The composition unit 418 at the further subsequent stage, composites the broadcast video on which the display of the data broadcasting has been superimposed, and the character super display and the subtitle display output from the composition unit 416, so as to generate the video signal for output.

The operation of the receiver 12 illustrated in FIG. 4, will be described.

The tuner/demodulation unit 401 receives the broadcast signal, and performs the demodulation processing so as to acquire the TLV stream. The MMT demultiplexer 402 performs the demultiplexing processing and the depacketization processing to the TLV stream so as to extract the respective encoded signals of the NTP time information, the video, the audio, the character supers and subtitles, the content, and the general-purpose data, together with the signaling information so that the packet filter 402-1 performs the allocation to each of the video decoder 404, the audio decoder 405, the character super decoder 406, the subtitle decoder 407, the multimedia (MM) cache 408, and the SI filter 402-2.

In addition, the NTP packet extracted by the demultiplexer 402 is allocated to the clock recovery unit 403. On the basis of the time information disposed on the NTP packet, the clock recovery unit 403 generates the time information synchronized with this time information. That is, the clock recovery unit 403 generates the time information agreeing to the time information generated by the clock unit 301 on the side of the broadcast output system 11. The time information that has been generated, is output to each of the video decoder 404, the audio decoder 405, the character super decoder 406, and the subtitle decoder 407, in order to decode each in the timed transport media.

The encoded video signal extracted by the MMT demultiplexer 402 is sent to the video decoder 404 so as to be decoded so that the video signal in the baseband is acquired. The character super encoded signal extracted by the demultiplexer 402 is sent to the character super decoder 406 so as to be decoded so that the character super display signal is acquired. In addition, the subtitle encoded signal extracted by the demultiplexer 402 is sent to the subtitle decoder 407 so as to be decoded so that the subtitle display signal is acquired.

On the basis of the MMT-SI received through the SI filter 402-2 and the SI cache 409, the broadcast system control unit 410 starts the processing of the application so as to control the entire reception processing operation of the receiver 12.

The application engine 411 performs the processing of the application (e.g., the HTML5 document) cached in the multimedia cache 408 so as to generate the display signal and the audio signal of the data broadcasting. The application engine 411 reflects the general-purpose data that has been acquired, to a display of the application.

The scaler 414 performs the scaling processing of the video signal (the broadcast video) decoded by the video decoder 404. In addition, the composition unit 416 composites the character super display decoded by the character super decoder 406 and the subtitle display decoded by the subtitle decoder 407. After that, the composition unit 417 composites the broadcast video to which the scaler 414 has performed the scaling processing, and the display signal of the data broadcasting generated by the application engine 411. The composition unit 418 at the further subsequent stage, composites the broadcast video on which the display of the data broadcasting has been superimposed, and the character super display and the subtitle display output from the composition unit 416, so as to generate the video signal for the output.

In addition, the composition unit 415 composites the audio signal decoded by the audio decoder 405 and the audio signal for the data broadcasting reproduced by the application engine 411, so as to generate the audio signal for the output.

B. Configuration of Broadcast Signal

One broadcast service is a package including a plurality of components, such as video, audio, subtitles, and content (note that the one broadcast service corresponds to one channel, namely, one broadcast program). For example, the video, the audio, and the subtitles relating to a main body of the broadcast program are timed media, and the content is non-timed media. In the MMT format, the timed and non-timed media are easy to use with a combination of a broadcast transport line and a communication transport line.

Figure 5:
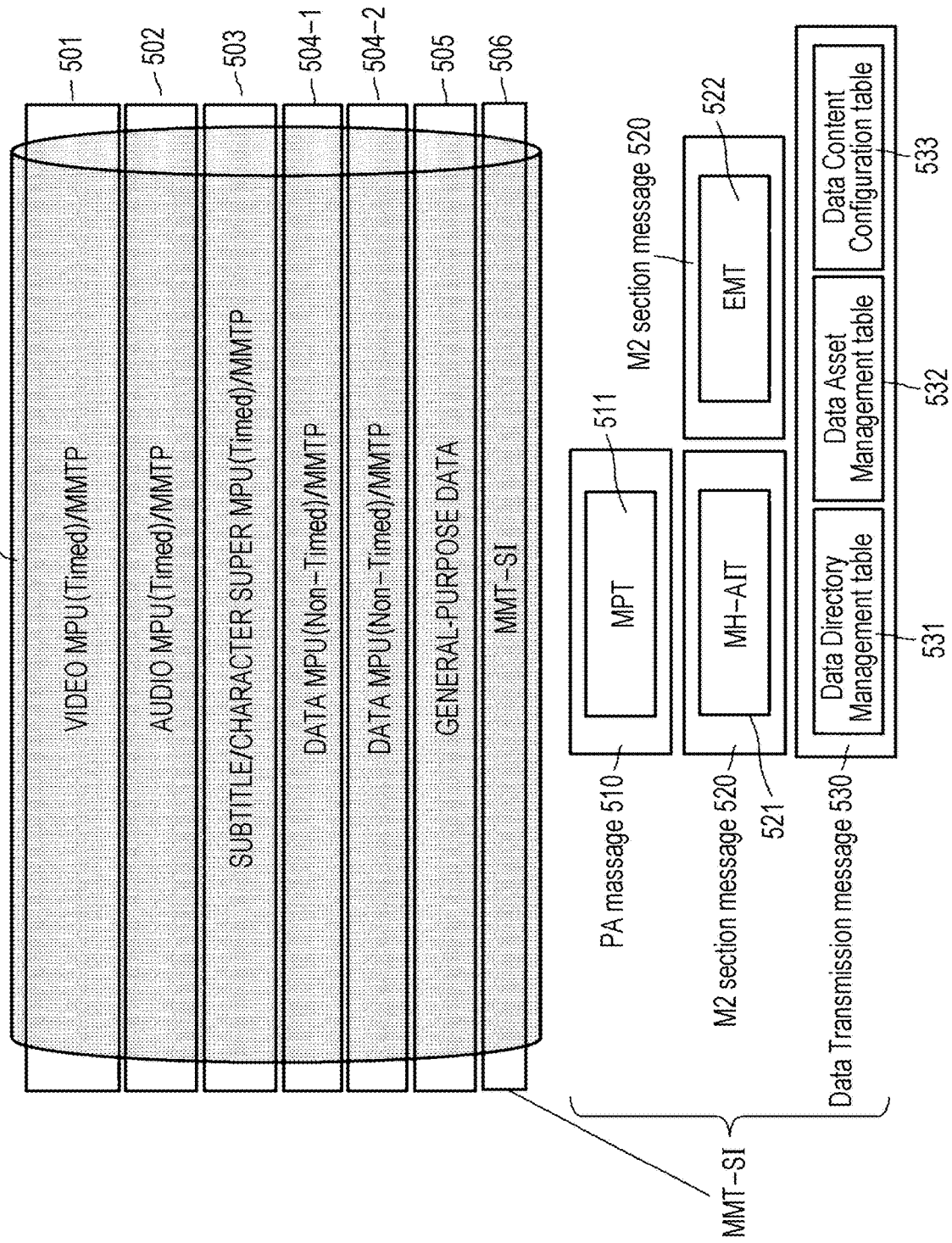
FIG. 5 is a diagram of an image of a broadcast signal 500 transported in the MMT format.

FIG. 5 illustrates an image of a broadcast signal 500 output from the broadcast output system 11 to the receiver 12 through the broadcast transport line in accordance with the MMT format.

Each component included in the broadcast service (the package), is defined as an "asset" in the MMT transport format, and each asset is transported with a dedicated elementary stream (ES) (hereinafter, referred to as a "stream"). In the example illustrated in FIG. 5, the broadcast signal 500 includes streams 501 to 505 for assets, such as video, audio, subtitles, content, and general-purpose data. In addition, a stream 506 for signaling of control information (MMT-SI) relating to the broadcast service, is also included.

Each asset is identified with a unique asset identifier (asset_id). The asset identifier uniquely corresponds to a component tag (component_tag) identifying the component. The asset of the video corresponds to a video component, the asset of the audio corresponds to an audio component, the asset of the subtitles corresponds to a subtitle component, the asset of the content (a data asset) corresponds to the component of data files included in the content, and the asset of the general-purpose data corresponds to a general-purpose data component.

The assets each include a set of at least one MPU having the same asset identifier shared (a logic group), and the assets are transported with the corresponding streams 501 to 505. Therefore, each MPU is uniquely specified with the asset identifier and an MPU sequence number on the stream corresponding to the asset identifier. Each MPU is a format being a transport unit in the MMT format, and includes at least one MFU. For the data asset, each file (each item) included in the content is stored in one MFU so as to be transported (note that, a file having a large size may be fragmented so as to be stored in a plurality of MFUs). According to the present embodiment, it is assumed that an MPU being the transport unit agrees with a directory in content production.

Then, the timed and non-timed media data that have been encoded, is converted into the MPU format so as to be MMTP-packetized so that the transport is performed with the IP packets in the respective ESs. Each ES corresponds to one IP data flow. The IP data flow referred to here, includes a set of the IP packets in which the values of five types of fields all are the same, the five types of fields including a source IP address and a destination IP address of an IP header and a UDP header, a protocol classification, a source port number, and a destination port number of the IP header.

In the example illustrated in FIG. 5, the MMTP packets of the encoded video signal including the MPU logic group having the common asset identifier for a video signal, are transported in the stream 501. Similarly, the MMT packets of the encoded audio signal including the MPU logic group having the common asset identifier for an audio signal, are transported in the stream 502. The MMTP packets of the encoded subtitle signal including the MPU group having the common asset identifier for a subtitle signal, are transported in the stream 503. In addition, the MMTP packets of the encoded application including the MPU logic group having the common asset identifier for a data broadcast service, are transported in the stream 504-1. The MMTP packets of the encoded application including the MPU logic group having the common asset identifier for a different broadcast service, are transported in the stream 504-2. In addition, the MMTP packets of the encoded general-purpose data signal including the MPU group having the common asset identifier, are transported in the stream 505.

The streams 504-1 and 504-2 are each assumed to be a dedicated ES that transports an individual data asset to which a different asset identifier has been allocated. For example, a data asset for providing a program-linked data broadcast service operating with the broadcast program, is transported in the one stream 504-1. A data asset for providing a program-non-linked data broadcast service not operating with the broadcast program, is transported in the other stream 504-2 (e.g., independent data broadcasting, such as weather forecasting or news, that finishes by itself without being directly related to the main body of the broadcast program). Each file included in the data broadcasting, is repeatedly transported in each of the streams 504-1 and 504-2 in predetermined cycles (e.g., with 10-second periods) over a local content period.

Note that, as omitted in FIG. 5, the broadcast transport line and a communication transport line can be used in common in the MMT format. For example, the non-timed media, such as the data broadcasting, can be transported through the communication transport line, such as the IP network, instead of being transported with the streams 504-1 and 504-2 of the broadcast signal 500 together with the timed media in the same broadcast service.

The stream 506 is used for the signaling in the MMT format, namely, the transport of the MMT-SI being the control information indicating information relating to the configuration of the MMT package and the broadcast service. An MMT message including the MMT-SI, is MMTP-packetized so as to be repeatedly transported in a carousel format in the stream 506. The transport cycle of the MMT-SI in the stream 506 is required to be shorter than the transport cycle of the data broadcasting in each of the streams 505-1 and 504-2, in order to completely perform reception processing to the broadcast signal in the data broadcasting on the receiver side (e.g., approximately one second).

The MMT-SI includes messages, tables, and descriptors. Examples of the messages transported with the stream 506, can include a PA message 510, M2 selection messages 520, and a data transmission message 530.

The PA message 510 includes the control information indicating, for example, the configuration of the broadcast program, and includes a container storing an MMT package (MP) table 511 describing information regarding, for example, a list of the assets and the positions thereof included in the package, a package list (PL) table (PLT), and a layout configuration (LC) table (LCT) (only the MP table is illustrated). The PLT indicates the IP data flow through which the PA message of the MMT packages provided as the broadcast service is transported, and a packet ID together with a list of the IP data flows through which the IP services are transported. In addition, the LCT is used to associate layout information for presentation with a layout number.

The MP table 511 includes a table indicating basic reception control information per broadcast service, and specifically provides information regarding the list of the assets and the location information of each asset (a packet identifier) included in the package. In addition, the MP table 511 includes an MPT descriptor, such as an application service descriptor. The application service descriptor indicates entry information of an application (e.g., entry information of the data transmission message and the respective M2 section messages that transport the MH-AIT and the EMT). In addition, the MPU table 511 includes an MPU time stamp descriptor that provides the presentation time of each MPU, arranged.

Figure 6:
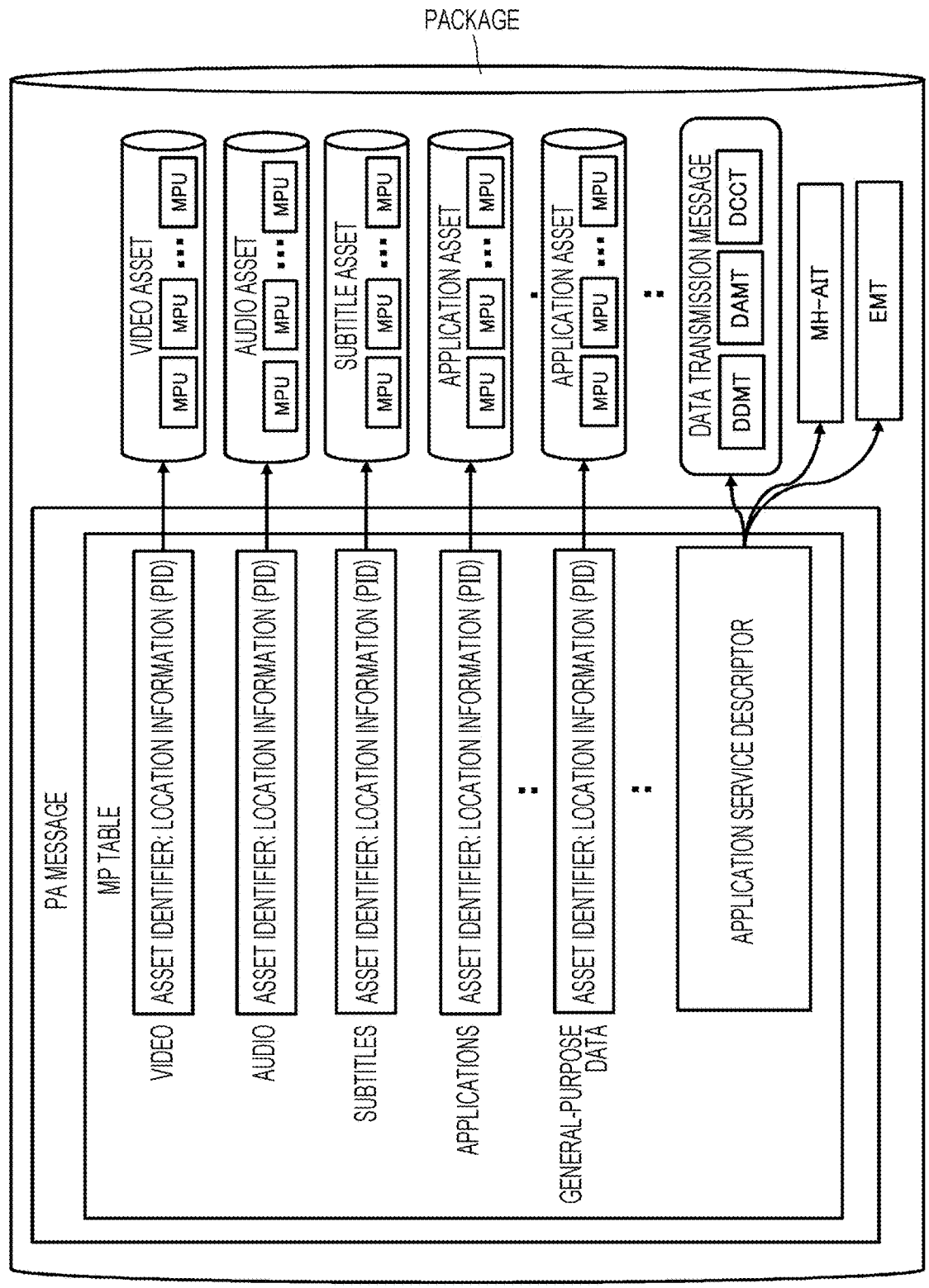
FIG. 6 is a diagram of a mechanism of specifying each asset relating to a broadcast service from an MP table in a PA message.

The PA message 510 includes an entry point of the broadcast service, and a fixed packet identifier (e.g., 0x0000) is allocated to the MMTP packet that transports the PA message 510. Therefore, the fixed packet identifier is directly specified on the stream 506 so that the PA message 510 can be acquired on the receiver side. Then, as illustrated in FIG. 6, each asset (the video, the audio, the subtitles, the content, and the general-purpose data) and the other messages included in the package (the broadcast program), can be indirectly specified with reference to the MP table 511 transported with the PA message 510.

FIG. 7 illustrates an exemplary syntax of the MP table 700. The definition of each parameter of the MP table will be described below.

table_id is an 8-bit fixed value (0x20) identifying that the table is the MP table. version is an 8-bit integer value indicating the version number of the MP table. For example, the version is incremented by +1 in a case where even a part of a parameter (a descriptor) included in the MP table is updated. length is a parameter having a 32-bit length, the parameter indicating the size of the MP table counted immediately after the field of the length, in units of bytes. In addition, MPT mode indicates an operation when the MP table has been fragmented into subsets.

MMT_package_id_length indicates the size of text information of a package identifier (MMT_package_id), in units of bytes. The package identifier (MMT_package_id) is indicated in units of bytes (MMT_package_id_byte) in the following loop of the package identifier. The package identifier is an identifier for the entire package including, as the components, the assets, such as all the signals (the video, the audio, and the subtitles) and the file data, transported with the broadcast signal (the IP data flows). The identifier includes the text information, and the higher-order 16 bits have a value the same as that of a service identifier for identifying the service.

MPT_descriptor_length indicates the size of an MP table descriptor area, in units of bytes. The description of the MP table descriptor is given in units of bytes (MPT_descriptors_byte) in a loop of the MP table descriptor. Basic information relating to reception control of the corresponding entire broadcast service (package), is described in the MPT descriptor. For example, the application service descriptor specifying the entry information of the application relating to the service, such as the application information table (MH-AIT), the data transmission message, and the event message table (EMT), is necessarily arranged as one MPT descriptor.

number_of_assets is an 8-bit parameter indicating the number of the assets on which the information is given with the MP table. Asset information loops are arranged, the number of the asset information loops being equivalent to a number indicated with the number_of_asset. The respective parameters of an as set identifier (asset_id), general location information (MMT_general_location_info), and an asset descriptor (asset_descriptor) as the information regarding an individual asset are arranged in one asset information loop. The information arranged in the asset information loop, will be described below.

identifier_type indicates the ID system of an MMTP packet flow. 0x00 is set for the ID system indicating the asset identifier (asset_id). asset_id_scheme indicates the format of the asset identifier. asset_id_length indicates the size of text information of the asset identifier, in units of bytes. The asset identifier is indicated in units of bytes (asset_id_byte) in the following loop of the asset identifier.

asset_type indicates the type of the asset (e.g., the video, the audio, the character supers/subtitles, or the application) with a character string having a 32-bit length. asset_clock_relation_flag is a flag indicating whether the clock information field of the asset is present. When the flag is 1, a clock information identification field (asset_clock_relation_id) and a timescale flag field (asset_timescale_flag) are present. When the flag is 0, no fields are present. location_count indicates the number of pieces of location information of the asset, and MMT_general_location_info being the location information of the corresponding asset is indicated in the following location information loop repeated by a number indicated with the location_count.

The asset_type indicates the type of the asset (e.g., the video, the audio, the character supers/subtitles, or the application) with the character string having the 32-bit length. Table 1 below illustrates the types of the assets expressed by the asset_type (characters).

TABLE 1

| asset type | Definition of asset type |
| --- | --- |
| hvc1 | HEVC prescribed by ITU-T Recommendation H. 265 |
| mp4a | ISO/IEC 14496-3 audio |
| stpp | Timed text (subtitles/character supers) |
| aapp | Applications |
| asgd | Timed general-purpose data |
| aagd | Non-timed general-purpose data |

The asset_clock_relation_flag is the flag indicating whether the clock information field of the asset is present. When the flag is 1, the clock information identification field (asset_clock_relation_id) and the timescale flag field (asset_timescale_flag) are present. When the flag is 0, no fields are present. The location_count indicates the number of pieces of location information of the asset, and the MMT_general_location_info being the location information of the corresponding asset is indicated in the following location information loop repeated by the number indicated with the location_count. With the detailed description of the MMT_general_location_info omitted, the location information of the asset for the MMTP packets in the data flow of IPv4 or IPv6, is described in the format of the packet identifier (packet_id:PID) on the ES being the acquisition destination of the asset. Therefore, an asset identifier is extracted on the MP table so that the corresponding packet identifier on the ES (the IP data flow) can be extracted (refer to FIG. 6).

asset_descriptor_length indicates the size of text information of the asset descriptor (asset_descriptor), in units of bytes. The description of the descriptor per asset, is indicated in units of bytes (asset_descriptors_byte) in the following asset_descriptor loop. Examples of the asset descriptor arranged in the asset information loop (the second loop in the MP table), can include: an "MH stream identification descriptor" labeling a component stream (namely, specifying the component tag corresponding to the asset); an "MH-data encoding format descriptor" used to identify a data encoding format in order to identify the data encoding format to each asset except the video and the audio; the "MPU time stamp descriptor" providing the presentation time of each MPU; an "MPU extension time stamp descriptor" providing, for example, the decoding time of an access unit in each MPU; an "asset group descriptor" providing the asset group relationship and priority in the group; an "MPU presentation area specification descriptor" providing the presentation position of each MPU; and a "dependence relationship descriptor" providing an asset ID of each asset in a dependence relationship.

Refer back to FIG. 5. The M2 section messages 520 each include a message that transports the section extension format of MPEG-2 Systems and include a container storing one signaling table in a section format. One table, such as the application information table (MH-AIT) 521 or the event message table (EMT) 522, is stored in one M2 section message 520. The MH-AIT 521 includes a table specifying dynamic control information relating to the application and additional information necessary for executing the application. In addition, the EMT 522 includes a signaling table used for the event message transport format, and stores information (an event message descriptor) relating to an event message (timed/non-timed messages from the broadcast station to the application on the receiver).

FIG. 8 illustrates an exemplary syntax of the MH-AIT 800 transported with the M2 section message as the container. The definition of each parameter in the MH-AIT, will be described below.

table_id (table identification) is an 8-bit fixed value identifying that the table is the application information (AI) table in various types of signaling information, and 0x89 is set according to the present embodiment. section_syntax_indicator (a section syntax indicator) has a 1-bit field and is constantly "1". section_length (a section length) has a 12-bit field, and prescribes the byte length of a section from the section length field to the end of the section including CRC32. The value does not exceed 4093 (0xEFD in hexadecimal number).

application_type (an application type) has a 16-bit field, and indicates the type of an application being an object to be controlled in the MH-AIT. The allocation of the application_type complies with Table 2 below.

TABLE 2

| Application format | Description |
| --- | --- |
| 0x0000 | reserved_future_use |
| 0x0001 | ARIB-J application |
| 0x0002-0x000F | reserved_future_use |
| 0x0010 | Broadcasting and communication linked HTML 5 application |
| 0x0011 | ARIB-J-HTML 5 application |
| 0x0012-0x7FFF | reserved_future_use | version_number (a version number) has a 5-bit field, and is the version number of a subtable. The version_number is the version number of the MH-AIT, and is incremented by +1 in a case where information in the subtable has varied. In addition, when the value of the version number becomes "31", the value next goes back to "0". current_next_indicator (a current next indicator) is constantly "1". section_number (a section number) has an 8-bit field, and represents a section number. The section number of the first section in the subtable, is 0x00. The section number is incremented by +1 every time a section having the same table identification and application type is added. last_section_number (a last section number) has an 8-bit field, and prescribes the last section number in the subtable to which the section belongs.

common_descriptor_length (a common descriptor loop length) has an 8-bit field, and indicates the byte length of the subsequent descriptor. The descriptor (a common descriptor) is written in a series of areas including common loops, the number of the common loops being equivalent to the byte length. The common descriptor area is applied to all the applications in the AIT subtable.

application_loop_length is an area into which the number of pieces of application information included in the MH-AI table is written. Then, application information loops are arranged, the number of the application information loops being equivalent to a number indicated with the application_loop_length.

application_identifier (an application identifier), application_control_code (an application control code), and the application information are arranged in one application information loop.

Here, the application_identifier (the application identifier) is a parameter identifying the application. The application_control_code (the application control code) has an 8-bit field, and prescribes a control code that controls the state of the application. The semantics of the field depends on the value of the application type. Table 3 illustrates the semantics of the application control code in a case of being independent of the application type.

TABLE 3

| Application control code value | Identification name | Definition |
| --- | --- | --- |
| 0x01 | AUTOSTART | Start application |
| 0x02 | PRESENT | Indicate that application is ready to perform |
| 0x04 | KILL | Finish application |
| 0x05 | PREFETCH | Acquire and retain application | application_descriptor_loop_length (an application information descriptor loop length) indicates the byte length of an application information descriptor, and descriptor (the application information descriptor) is written into an application information descriptor area 801 including loops, the number of the loops being equivalent to the byte length. The application information descriptor in the descriptor area 801, is only applied to the application specified with the application_identifier, differently from the common descriptor. For example, an MH-application descriptor and an MH-transport protocol descriptor are arranged in the application information loop.

Then, a cyclic redundancy check (CRC) CRC32 complying with ITU-T Recommendation H.222.0, is added to the end of the table.

Figure 9:
FIG. 9 is a table of an exemplary syntax of a transport protocol descriptor 900.

FIG. 9 illustrates an exemplary syntax of the MH-transport protocol descriptor 900 (hereinafter, simply referred to as a "transport protocol descriptor"). The transport protocol descriptor is arranged in a common descriptor loop or application information descriptor loop of the MH-AIT, in order to specify a transport protocol of, for example, broadcasting or communication, for transport means of the application and to indicate the location information of the application dependent on the transport protocol. The definition of each parameter of the transport protocol descriptor, will be described below.

descriptor_tag indicates an 8-bit fixed value identifying the descriptor 900. descriptor_length is an 8-bit area into which the byte length of data of the descriptor subsequent to the field is written.

protocol_id (a protocol identifier) indicates a protocol of transporting the application. Table 4 below illustrates the definition of each value of the protocol identifier. As the value of the protocol identifier, 0x0003 prescribes HTTP and HTTPS transport, and 0x0005 prescribes MMT and non-timed transport.

TABLE 4

| Protocol identification information value | Definition |
| --- | --- |
| 0x0000 | reserved_future_use |
| 0x0001-0x0002 | reserved |
| 0x0003 | HTTP/HTTPS transport |
| 0x0004 | Data carousel transport |
| 0x0005 | MMT non-timed transport |
| 0x0006-0xFFFF | reserved_future_use |

In a case where one application is transported in a plurality of lines, transport_protocol_label (a transport protocol label) is a value uniquely identifying the transport means, and corresponds to the field of the application information descriptor having the same name.

selector_byte (a selector byte) is an area into which supplementary information is stored, and prescribes a syntax per protocol identifier. FIG. 10 illustrates an exemplary syntax of the selector byte 1000 in common between the HTTP/HTTPS transport and the MMT/non-timed transport. Each parameter of the selector byte will be described below.

URL_base_length indicates the byte length of a base portion of a URL for acquiring the application, and the character string of the base portion of the URL for acquiring the application, is written into a series of areas including loops, the number of the loops being equivalent to the byte length, in units of bytes (URL_base_byte).

URL_extension_count indicates the number of extension portions of the URL for acquiring the application (URL_extension subsequent to the URL_base), and URL_extension loops are arranged, the number of the URL_extension loops being equivalent to a number indicated with the URL_extension_count. Then, in one URL_extension loop, URL_extension_length indicates the byte length of the extension portion of the URL, and the character string of the extension portion of the URL is written into a series of areas including loops, the number of the loops being equivalent to the byte length, in units of bytes (URL_extension_byte).

For example, if the base portion of the URL is "http://www.xbc.com" and the extension portion of the URL is "index.html", the character strings thereof are coupled so that a complete URL "http://xbc.com/index.html" can be acquired.

In other words, the MH-AIT indicates the state and location information of each application, in each application information loop. That is, the application_control_code (the application control code) indicates the state of the application and additionally the transport protocol descriptor indicates the location information of the application in the URL format.

Refer back to FIG. 5. The data transmission message 530 includes a message storing tables relating to data transport of the files included in the content. The data transmission message 530 includes a container that can simultaneously store three tables including a data directory management table (DDMT) 531, a data asset management table (DAMT) 532, and a data content configuration table (DCCT) 533, at a maximum. For a data broadcast service, the data directory management table and the data asset management table are essential, but the data content configuration table is optional.

Here, the data directory management table 531 includes a table for managing the file configuration of the application in units of directories in the content production. A directory structure relating to nodes (a directory, and a subdirectory and a file included in the directory) included in one package, is described in the table so that the file configuration of the application and the configuration for file transport can be separated. The table indicates the correspondence relationship between a path name of each node, such as the directory or the file, and a node tag identifying each node in the data transmission message.

In addition, the data asset management table 532 includes a table for managing the data asset that transports the content, and describes version information per MPU to the configurations of the MPUs in the data asset. Specifically, the table indicates the correspondence relationship between a download identifier of each component, the node tag identifying, in the data transmission message, a node (a file or a directory) included in each of the MPUs that transport the components, and an item identifier identifying the node on each ES.

In addition, the data content configuration table 533 includes a table for managing configuration information of the content, and can describe the node tag identifying, in the data transmission message, a node (a file or a directory) included in the content. The table can indicate information regarding a presentation unit (PU) included in the content, and, in this case, describes a presentation unit identifier identifying the presentation unit, and the node tag identifying, in the data transmission message, a node (a file or a directory) included in each presentation unit. In addition, the table can arrange a link destination PU descriptor indicating the presentation unit, the link destination PU descriptor being linked with the presentation unit, and a lock cache specification descriptor and an unlock cache specification descriptor that control caching of each node (to the multimedia cache 408). On the receiver side, the table can be used for cache control flexible and effective for the file data for the data broadcast application.

The current MMT broadcast standards adopt a data transport control signaling format in which the directory configuration of the content in production is described with the data directory management table 531 and meanwhile the configuration of the broadcast transport data is described with the data asset management table 532. Therefore, there is provided the flexibility of being able to independently manage the production of the content and the configuration of the broadcast transport data.

FIG. 11 illustrates an exemplary syntax of the data directory management table (DDMT) 1100 transported with the data transmission message as the container. The definition of each parameter of the data directory management table, will be described below.

An 8-bit fixed value indicating that the table is the data directory management table in the various types of signaling information, is written into table_id (a table identifier). version_(a version) is a parameter indicating the version of the data directory management table, the parameter having an 8-bit integer value. For example, the version is incremented by +1 in a case where even a part of a parameter included in the table is updated. length is a parameter having a 16-bit length, the parameter indicating the size of the data directory management table counted immediately after the field of the length, in units of bytes.

base_directory_path_length indicates the byte length of a base directory node path area, and a base node directory path is written into a series of areas including loops, the number of the loops being equivalent to the byte length, in units of bytes (base_directory_path_byte). The base directory path is, for example, written in an absolute URL format for accessing the corresponding directory.

num_of_directory_nodes indicates the number of directory nodes described in the data directory management table. Then, directory node loops are arranged, the number of the directory node loops being equivalent to a number indicated with the num_of_directory_nodes.

Attribute information of each directory node stored in the data directory management table and information regarding each piece of file data included in the directory, are stored in one directory node loop.

node_tag indicates a label, as the node tag of the directory node, identifying the directory. directory_node_version indicates the version of the directory node. directory_node_path_length indicates the byte length of a directory node path area, and a directory node path is written into a series of areas including loops, the number of the loops being equivalent to the byte length, in units of bytes (directory_node_path_byte).

num_of_files indicates the number of files included in the directory. Then, file node loops indicated with reference numeral 1101, are arranged, the number of the file node loops being equivalent to a number indicated with the num_of_files. As detailed information per file included in the directory, node_tag and a file name are stored in each file node loop 1101. The node_tag in each loop indicates a label, as the node_tag of the file, identifying the file. file_name_byte indicates the byte length of a file name area, and the file name is written into a series of areas including loops, the number of the loops being equivalent to the byte length, in units of bytes (file_name_length). file_name corresponds to item_URL specified with the transport protocol descriptor (the selector byte) of the MH-AIT.

The directory node path is written in a relative URL format for accessing the corresponding directory, to the base directory path. Furthermore, the character strings of the paths with the file name are coupled so that a complete URL can be acquired to access the file. For example, if the base directory path (URL) is "http://www.xbc.com", the directory node path (URL) is "programA", and furthermore the file name described in the file node loop 1101 is "index.html", the character strings thereof are coupled in accordance with a specification in the data directory management table so that a complete URL "http://www.xbc.com/programA/index.html" can be acquired.

In addition, FIG. 12 illustrates an exemplary syntax of the data asset management table (DAMT) 1200 transported with the data transmission message as the container. Each parameter of the data asset management table, will be described below.

table_id (table identification) is an 8-bit fixed value indicating that the table is the data asset management table in the various types of signaling information. version (a version) is a parameter indicating the version of the data asset management table, the parameter having an 8-bit integer value. For example, the version is incremented by +1 in a case where even a parameter included in the data asset management table is updated. length is a parameter having a 16-bit length, the parameter indicating the size of the data asset management table counted immediately after the field of the length, in units of bytes.

number_of_data_components is an 8-bit parameter indicating the number of data components included in the package (namely, the number of data assets included in the broadcast signal). Data component loops are arranged, the number of the data component loops being equivalent to a number indicated with the number_of_data_components, so that information per data component is stored. Attribute information of each data component and information regarding the MPUs that transport each data component, are written into each data component loop.

As the attribute information of a data component, transaction_id (a transaction identifier), component_tag (a component tag), and download_id (a download identifier) are included. The transaction_id is an identifier having a version function for the data component. The component_tag is a label for identifying the data component. The component_tag has a value the same as that of the component_tag in the MH stream identification descriptor arranged as the asset descriptor in the MP table. In addition, the download_id includes information set for identifying a receipt number for download, and acts as a label for uniquely identifying data content. Note that, the download identifier is, as necessary, written into a multi-extension header area in each MMTP packet that transports the non-timed media, such as the content.

num_of_mpus indicates the number of MPUs that transport items (files) included in the data component. Then, attribute information of each MPU is stored in each MPU loop arranged, the number of the MPU loops being equivalent to a number indicated with the num_of_mpus. MPU_sequence_number is a MPU sequence number allocated to the MPU in the data component (the data asset). In addition, num_of_items indicates the number of items (file data) included in the MPU. Then, item loops indicated with reference numeral 1201, are arranged, the number of the item loops being equivalent to a number indicated with the num_of_items. As detailed information per item, namely, per file, item_id, node_tag, item_size, item_version, item_checksum, and item_info are stored in each item loop 1201.

The item_id (an item identifier) is a 32-bit value uniquely identifying the item used for file transport in the data asset. The node_tag is a 16-bit value identifying the item, as a node tag corresponding to the item, and corresponds to a node tag identifying the file transported with the item. The 16-bit node_tag is used as the signaling information instead of the 32-bit item_id so that a reduction can be made in bit size necessary for identifying the item on the data transmission message. The item_size indicates the size of the item in units of bytes. The item_version indicates the version of the item, and the item_version is incremented by +1 every time the description of the item is updated.

The item_checksum indicates the checksum of the item. Note that it is considered that necessarily setting a checksum to all the files causes a large amount of information. Thus, 1-bit check_sum_flag is set, and only in a case where 1 is substituted for the 1-bit check_sum_flag, the 32-bit item_checksum appears in the item loop 1201. The check-sum_flag is a flag indicating whether the checksum has been described, and describes the item_checksum when the flag is 1.

The item_info_length indicates the byte length of the subsequent item information area, and information regarding the item, namely, the file, is written into a series of areas including loops, the number of the loops being equivalent to the byte length, in units of bytes (item_info_byte). For example, descriptors, such as an MH-Type descriptor and an MH-Compression Type descriptor, are arranged in the areas. The MH-Type descriptor is a descriptor indicating the media type of the file transported in the application transport format. In addition, the MH-Compression Type descriptor means that the item to be transported has been compressed, and indicates the compression algorithm thereof and the byte length of the item before the compression.

As indicated with reference numeral 1202, information regarding each MPU is stored at the end of each MPU loop. Specifically, MPU_info_length indicates the byte length of the subsequent MPU information area, and the information regarding the MPU is written into a series of areas including loops, the number of the loops being equivalent to the byte length, in units of bytes (item_info_byte). In a case where the MPU agrees with the directory, an MPU node descriptor is arranged in the MPU information area 1202. In other words, the MPU including the MPU node descriptor arranged indicates that the items used for the file transport under the directory have been only stored. The MPU node descriptor indicates a node tag identifying the corresponding directory and information regarding index_item. The details will be described later.

A descriptor for the data component is arranged at the end of each data component loop. descriptor_loop_length indicates the entire byte length of the descriptor. The descriptor stores information regarding the descriptor (descriptor) into a series of areas including loops, the number of the loops being equivalent to the byte length of the descriptor_loop_length. The descriptor to be stored will be separately defined.

C. Packet Configuration in MMT Format

Examples of elements included in an encoded signal in the MMT, include an MFU, an MPU, an MMTP payload, and an MMTP packet. Adding an MMTP header to the MMTP payload makes the MMTP packet. As described above, the timed media, such as the video, the audio, and the subtitles, and the non-timed media, such as the content, are transported as MMTP packets.

Figure 13:
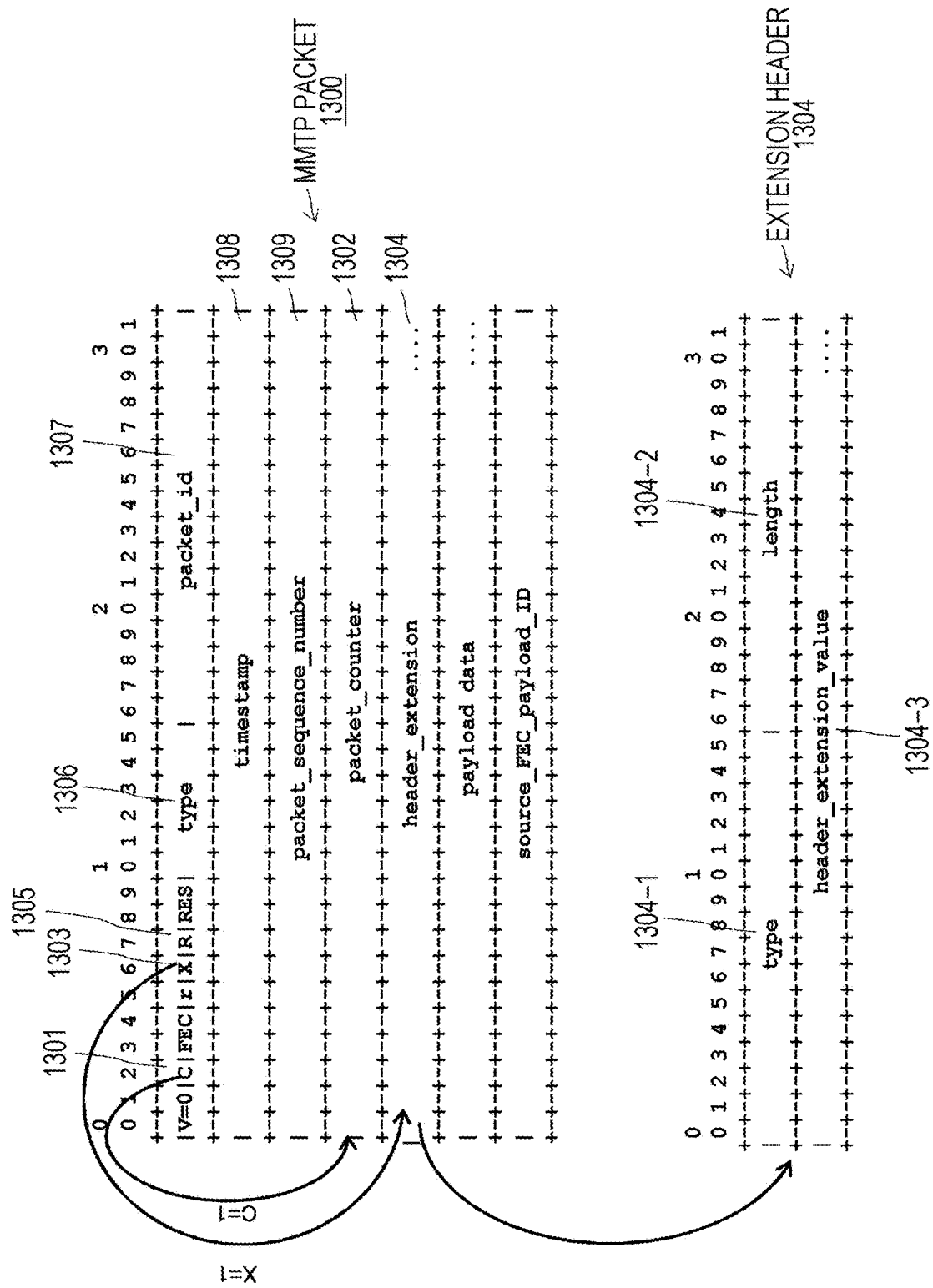
FIG. 13 is a diagram of an exemplary syntax of an MMTP packet 1300.

FIG. 13 illustrates an exemplary syntax of an MMTP packet 1300. The MMTP packet is a unit of media data formatted to be transported with an MMT protocol.

When 1 has been substituted for a packet counter flag "C" indicated with reference numeral 1301, it is indicated that the field of a packet counter indicated with reference numeral 1302 is present in the MMTP packet. The packet counter 1302 has a field having a 32-bit length into which an integer value indicating the order of MMTP packets in the same stream (an IP data flow) regardless of packet identifiers is written. The packet counter 1302 is incremented by 1 every time an MMTP packet is transmitted. The packet counter 1302 starts from an arbitrary value.

When 1 has been substituted for an extension header flag "X" indicated with reference numeral 1303, it is expressed that an extension header 1304 indicated with reference numeral 1304 is present. In addition, the lower portion of FIG. 13 illustrates an exemplary syntax of the extension header 1304. The extension header 1304 includes a type field having a 16-bit length indicated with reference numeral 1304-1, a length field indicated with reference numeral 1304-2, and a header_extension_value field indicated with reference numeral 1304-3. The byte length of the header_extension_value field is written into the length field. Extension information out of the specifications of the MMT can be written into the header_extension_value field.

When 1 has been substituted for a random access point (RAP) flag indicated with reference numeral 1305, it is expressed that the payload of the MMTP packet includes a random access point to the data stream of the data type thereof.

A type value expressing the data type of the payload of the MMTP packet, is written into a type field indicated with reference numeral 1306. Table 5 below illustrates the definition of the type value. If a type value of "0x00" has been written into the type field, it is found that the payload of the MMTP packet is the MPU (including a fragment of the MPU for the media).

TABLE 5

| Value | Data type | Definition of data unit |
|---|---|---|
| 0x00 | MPU | a media-aware fragment of the MPU |
| 0x01 | Generic object | A generic object such as a complete MPU or an object of another type |
| 0x02 | Signaling message | one or more signaling messages or a fragment of a signaling message |
| 0x03 | Repair symbol | a single complete repair symbol |

An integer value being a packet identifier for identifying the data type of the payload (in other words, for distinguishing the asset), is written into a packet_id field having 16-bit length indicated with reference numeral 1307. The value of the field originates from the asset identifier (asset_id) identifying the asset to which the MMTP packet belongs. The MP table (as described above) indicates mapping of the packet identifier (packet_id) and the asset identifier (asset_id).

The time at which the head byte of the MMTP packet is output from a transmission entity, is described with an NTP time stamp in a short-format prescribed by RFC 5905, into a timestamp field having a 32-bit length indicated with reference numeral 1308.

The sequence number for the MMTP packets having the same packet identifier (packet_id), is described with an integral value, into a packet_sequence_number field having a 32-bit length indicated with reference numeral 1309. The packet sequence number starts from an arbitrary value.

Figure 14:
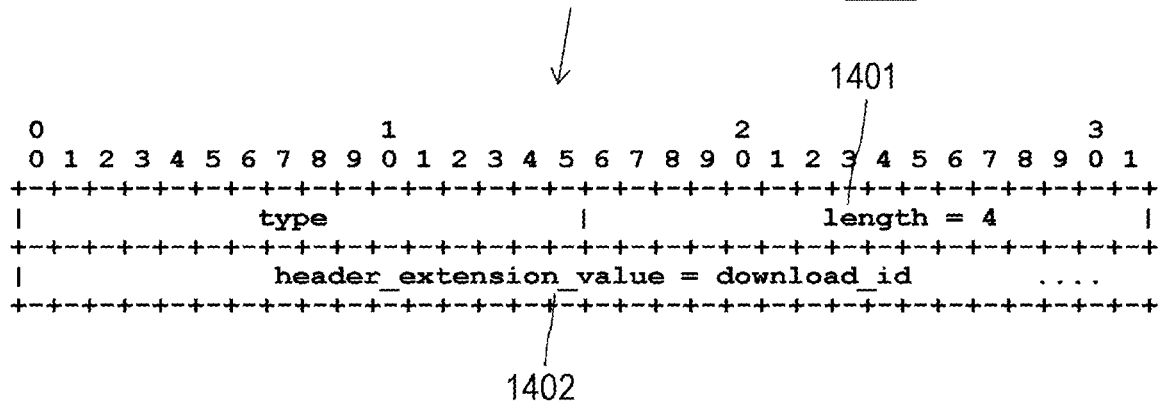
FIG. 14 is a diagram of an exemplary syntax of an extension header 1400 for the MMTP packet that transports non-timed media.

FIG. 14 illustrates an exemplary syntax of an extension header 1400 for an MMTP packet that transports the non-timed media, such as the content. As illustrated, as the byte length of a header_extension_value field, 4 is written into a length field 1401 in this case. A 4-byte download identifier (download_id) is described into the header_extension_value field 1402.

In transporting the MPU with the MMT protocol, the transmission side and the reception side need packetization and depacketization, respectively. Due to the packetization, the MPU is inserted into the MMTP payload so as to be transported with the MMTP packet. The format of the MMTP payload allows fragmentation of the MMTP payload to be performed, in order to enable a large payload to be transported. In addition, the format of the MTP payload allows for aggregation in which a plurality of MMTP payloads is inserted into a single MMTP payload, in response to a small data unit. On the reception side, the depacketization is performed to restore the original MPU data.

Figure 15:
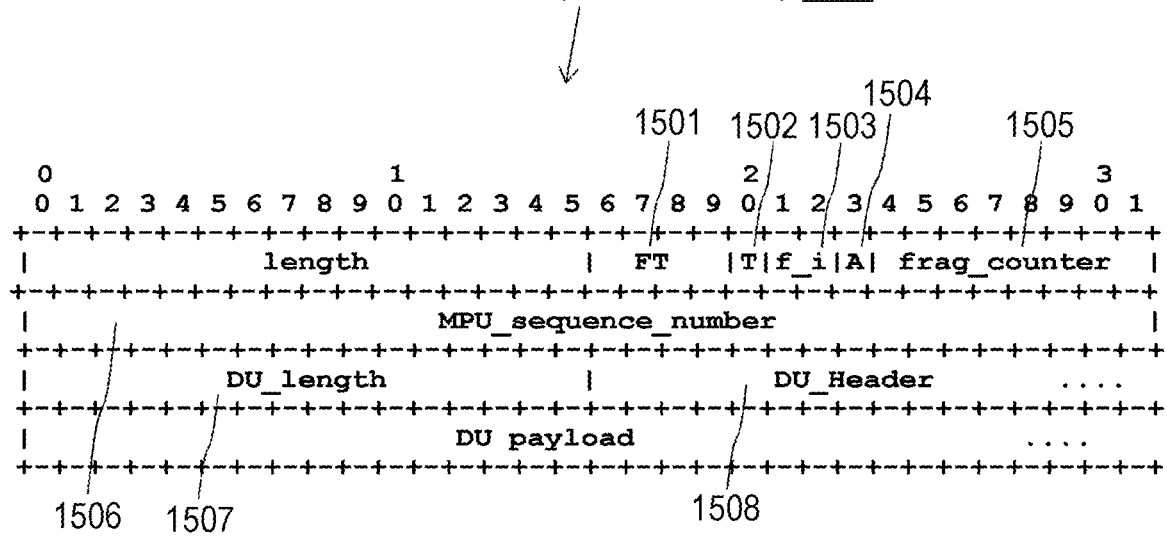
FIG. 15 is a diagram of an exemplary syntax of an MMTP payload 1500 in an MPU mode.

FIG. 15 illustrates an exemplary syntax of an MMTP payload 1500 in an MPU mode. The MPU mode is a case where "0x00" has been written into the type field 1306 of the MMTP header (refer to FIG. 13). The MMTP packet in the MPU mode is used for transporting the video, the audio, or the file data (the data broadcast application).

A fragment type (MPU fragment type: FT) field indicated with reference numeral 1501, indicates the fragment type of information stored in the MMTP payload, with a 4-bit value. The MMTP payload is encoded in accordance with the FT value. Table 6 below illustrates the definition of the FT value.

TABLE 6

| FT | Description | Content |
|---|---|---|
| 0 | MPU metadata | contains the ftyp, mmpu, moov, and meta boxes as well as any other boxes that appear in between. |
| 1 | Movie fragment metadata | contains the moof box and the mdat box, excluding all media data inside the mdat box. |
| 2 | MFU | contains a sample or sub-sample of timed media data or an item of non-timed media data. |

Timed (T) indicated with reference numeral 1502 is a time data flag, and indicates whether data stored in the MMTP payload specifies presentation time. When 1 has been described in the time data flag, it is indicated that the fragment of the MPU that transports the timed media has been stored in the MMTP payload. When 0 has been described, the fragment of the MPU that transports the non-timed media has been stored in the MMTP payload.

A fragmentation identifier (f_i) field indicated with reference numeral 1503, expresses information relating to the fragmentation of the data unit stored in the MMTP payload, in 2 bits. Table 7 below illustrates the definition of four values of the f_i.

TABLE 7

| Value | Definition of data unit |
| --- | --- |
| 00 | Payload includes integer number of data units. |
| 01 | Payload includes data unit of first fragment. |
| 10 | Payload includes data unit of intermediate fragment. |
| 11 | Payload includes data unit of last fragment. |

An aggregation (A) flag indicated with reference numeral 1504 indicates whether the MMTP payload stores at least two pieces of data. When the MMTP payload has aggregated a plurality of data units, 1 is described into the aggregation (A) flag.

In a case where the data has been fragmented, the number of pieces of the data fragmented subsequent to the portion stored by the MMTP payload, is described in a fragment_counter (a fragment counter) field having an 8-bit length indicated with reference numeral 1505.

In a case where the MMTP payload stores MPU metadata, movie fragment metadata, and an MFU, the sequence number of the MPU to which the MPU metadata, the movie fragment metadata, and the MFU belong, is described into an MPU sequence number (MPU_sequence_number) field indicated with reference numeral 1506. The MPU sequence number is information identifying the MPU in the asset, and the same MPU sequence number is given to all the MFUs in the same MPU.

Into a DU_length field having a 16-bit length indicated with reference numeral 1507, the length of the data unit (DU) subsequent to the field, is described. Note that, when the aggregation (A) flag 1504 indicates 0, no DU_length field 1507 is provided.

DU_Header indicated with reference numeral 1508, is the header of the data unit. Note that the FT value 1501 indicates 0 or 1 (in other words, not being the MFU), no DU_Header 1508 is provided. Each MFU includes a sample or a sub-sample of the timed media or an item of the non-timed media.

FIG. 16 illustrates an exemplary syntax of the DU_Header 1600 stored in the MMTP payload 1500 including the non-timed media arranged. The description of the DU_Header stored in the MMTP payload including the timed media arranged, will be omitted.

An item identifier (item_id) having a 32-bit length, identifying the item transported as a part of the MFU, is stored in the DU_Header 1600 illustrated. The item corresponds to a file included in the content, such as an HTML document (an application) or monomedia (e.g., an image, audio, or text) referenced from the HTML document. The item identifier is information identifying the item, namely, the MFU in the MPU. Therefore, the item can be uniquely specified with the combination of the packet identifier (packet_id) in the header and the download identifier (download_id) in the extension header in the MMTP packet described above and the item identifier (item_id) in the DU header, on the stream specified with the asset identifier.

Examples of elements included in an encoded signal in the MMT, include an MFU, an MPU, an MMTP payload, and an MMTP packet. The MPU is a transport unit in the MMT format, and the MFU is a unit smaller than the MPU. In transporting a video signal or an audio signal, the MPU is also a unit of processing. The MPU includes at least one access unit, and is a unit in which the single body of the MPU can perform decoding processing of video or audio. On the other hand, in transporting an application, one MFU stores one item (namely, an HTML document or a file, such as monomedia) used in the application, and the MPU being the transport unit includes a group of a plurality of items.

Figure 17:
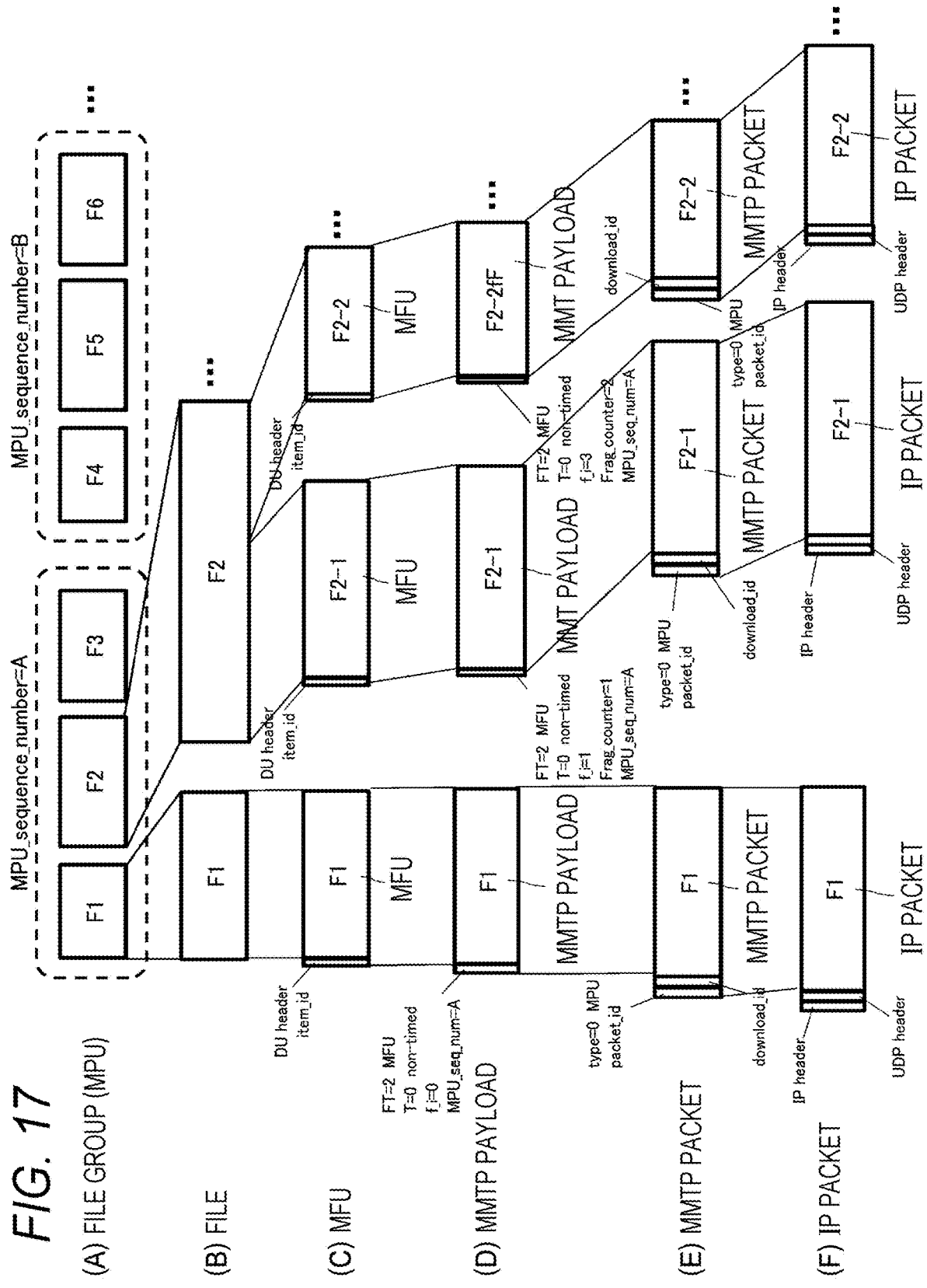
FIG. 17 is a diagram for describing a method of configuring packets in a case where the non-timed media is transported.

FIG. 17 illustrates a method of configuring a packet to be transported on a stream (an IP data flow). The figure illustrates an exemplary packet configuration in transporting the non-timed media.

One MPU including a group of three files F1, F2, and F3, and another MPU including a group of different three files F4, F5, and F6, are provided in FIG. 17(A). An MPU sequence number uniquely identified on the stream (in the data asset), is allocated to each MPU including the group of the files in this manner. An MPU sequence number "A" is allocated to the group of the files F1, F2, and F3.

In addition, FIGS. 17(B) and 17(C) illustrate that the files F1, F2, . . . grouped into the MPU have been each arranged in one MFU. The file size of the file data F1 is not large, and thus the file data F1 is brought into one DU payload, remaining intact. Meanwhile, the file size of the file data F2 is large, and thus the file data F2 is fragmented into two including F2-1 and F2-2 (fragmentation) so that each is brought into a different DU payload. Then, the DU header storing the item identifier (item_id) as illustrated in FIG. 16, is added to each DU payload so that the respective MFUs are provided.

FIG. 17(D) illustrates that each MFU has been brought into an MMTP payload. As illustrated in FIG. 15, the MMTP payload header including, for example, the fragment type (MPU fragment type: FT) field, the time data (T) flag, the fragmentation identifier (f_i) field, the fragment_counter field (note that, for the MFU that has been fragmented), and the MPU sequence number, is added to each of the DU payloads arranged with the MFUs so that the MFUs are brought into the MMTP payloads.

For the respective MFUs of the F1, the F2-1, and the F2-2, a value of "2" indicating "MPU" is described into the FT value and a value of "0" indicating the non-timed media, is set to the time data (T) flag. The F1 has not been fragmented so that "0" is described into the f_i field. In addition, the F2-1 and the D2-2 each include the MFU with the fragmentation so that the following expression is satisfied: f_i="1" and fragment_counter is added to the respective MFUs. In addition, all of the F1, the F2-1, and the F2-2 belong to the same MPU so that the same MPU sequence number "A" is added and additionally the item identifier (item_id) uniquely identifying the file, namely, the item, is described.

FIG. 17(E) illustrates that the MMTP header and the extension header are added to each MMTP payload so that MMTP packets are provided. As illustrated in FIG. 6, each MMTP header includes the type field and the packet identifier (packet_id). In addition, as illustrated in FIG. 14, the download identifier (dowmload_id) is stored in the extension header for each MMTP packet that transports the non-timed media. Not that, each MMTP payload is transported with one MMTP packet. Disposing a plurality of MMTP payloads onto one MMTP packet or transporting one MMTP payload over a plurality of MMTP packets, is not provided.

FIG. 17(F) illustrates that each MMTP packet has been brought into an IP packet. As illustrated, the UDP header and the IP header are added to each MMTP packet so that the IP packets are provided. Each MMTP packet is transported with one IP packet. Disposing a plurality of MMTP payloads onto one IP packet or transporting one MMTP payload over a plurality of IP packets, is not provided.

D. Improvement of MMT Data Transport Control Signaling in Efficiency (1)

As described above, the current MMT broadcast standards have the flexibility of enabling the directory configuration of the content in production and the configuration of the broadcast transport data, to be independently managed.

However, it is essential to describe detailed information at a file level into data transport control information, in order to ensure the flexibility. Specifically, the detailed information per file is described into each file node loop indicated with reference numeral 1101 in the data directory management table illustrated in FIG. 11 and into each item loop indicated with reference numeral 1201 in the data asset management table illustrated in FIG. 12 (as described above). In a case where it is assumed that the number of files increases by a hundreds or thousands level, the amount of information to be transported with the data transmission message, is excessive. As a result, there may be provided an adverse effect on the management of the data broadcast service, such as compression of the band of the content (application) to be originally transported, due to an increase in the transport rate of the MMT-SI.

Therefore, the present specification is to propose the technology of reducing the amount of information in the data directory management table and the data asset management table, on the assumption that a directory in production of the content agrees with an MPU being a transport unit for broadcasting. Making the directory agree with the MPU, may provide a useful case where the receiver can effectively perform reception processing to the content.

According to the technology disclosed in the present specification, detailed information regarding files under the directory agreeing with the MPU, is not transported in the data directory management table. Specifically, in the directory node loop corresponding to the directory agreeing with the MPU, even when the files are present under the directory in practice, the num_of_files is set to 0 so that the detailed information per file is not described in each file node loop indicated with reference numeral 1101.

In addition, according to the technology disclosed in the present specification, detailed information regarding items under the MPU agreeing with the directory, is not transported in the data asset management table. Specifically, in the MPU loop corresponding to the MPU agreeing with the directory, even when the items are present under the MPU in practice, the num_of_items is set to 0 so that the detailed information per item is not described in each item loop indicated with reference numeral 1201.

Note that, in order to acquire the items from the stream (the data asset), detailed information regarding each item to be transported in the data directory management table and the data asset management table, is required. Therefore, according to the technology disclosed in the present specification, a file described with the detailed information regarding the items under the MPU, deleted from the data asset management table, is described as one item (hereinafter, referred to as "index_item") and is passed to the data asset so as to be transported, instead of being the MMT-SI. In addition, the detailed information regarding the files under the directory agreeing with the MPU, is also described into the index_item.

In addition, according to the technology disclosed in the present specification, it is indicated that the MPU agrees with the directory, and additionally the MPU node descriptor that takes mapping of the MPU and the directory node, is arranged in the MPU information area 1202, in the data asset management table. The MPU node descriptor specifies the node tag of the corresponding directory, the presence of the index_item, and the item identifier thereof.

In other words, according to the technology disclosed in the present specification, the detailed information regarding the files or items to be transported with the MMT-SI (the data directory management table or the data asset management table), is described as an item being the index_item and is passed to the MPU in the data asset so as to be transported. The information size of the index_item, is substantially the same as that for the description into the MMT-SI, but the entire transport amount can be reduced and a sufficient band for the transport of the data asset can be ensured in consideration of having to transport repeatedly the MMT-SI in cycles shorter than those of the data asset.

Figure 18:
FIG. 18 is a table of an exemplary syntax of an MPU node descriptor 1800.

FIG. 18 illustrates an exemplary syntax of the MPU node descriptor 1800. The MPU node descriptor is arranged in the MPU loop agreeing with the directory in the data asset management table. Each parameter of the MPU node descriptor will be described below.

descriptor_tag is an 8-bit integer value identifying the descriptor 1800. descriptor_length is an area into which the byte length of data of the descriptor 1800 subsequent to the field of the descriptor_length is written.

node_tag indicates a node tag identifying the directory agreeing with the MPU.

index_item_exist_flag is a flag indicating whether the index_item is present. The following expression indicates that the index_item is present in the corresponding MPU in the data asset: index_item_exist_flag=1. In this case, the following expression is specified in the MPU loop in the data asset management table: num_of_items=0, and thus the detailed information 1201 on the items under the MPU is not described. In addition, the following expression is specified in the directory node loop corresponding to the MPU, in the data directory management table: num_of_files=0, and thus the detailed information 1101 on the files under the directory is not described.

Meanwhile, the following expression indicates that no index_item is present: index_item_exist_flag=0. In this case, the detailed information 1201 on the items under the MPU is described in the MPU loop in the data asset management table. In addition, the detailed information 1101 on the files under the directory is described in the directory node loop corresponding to the MPU, in the data directory management table.

index_item_id_flag is a flag indicating whether the item identifier of the index_item is specified. The following expression indicates that the item identifier of the index_item is specified: index_item_id_flag=1, and an item identifier (index_item_id) for the index_item, having a 32-bit length, is specified in an if statement including, as a condition, the logical conjunction with the following expression: index_item_exist_flag=1. Meanwhile, the following condition indicates that the index_item is present but the item identifier thereof is not specified: index_item_exist_flag=1 and index_item_id=0. In a case where the index_item is present but the index_item_id is not specified, the item identifier of the index_item is set to a fixed value (e.g., all-zero).

FIG. 19 illustrates an exemplary syntax of the index_item 1900. The index_item is an item in which the detailed information regarding the items or files to be originally transported in the data asset management table or the data directory management table has been described, and is transported as the data asset. Each parameter of the index_item will be described below.

num_of_items indicates the number of items on which the information is given with the index_item. The num_of_items corresponds to the number of the items (namely, the number of MFUs) included in the corresponding MPU. Then, the detailed information regarding each item or file is described into each item loop, the number of the item loops being equivalent to a number indicated with the num_of_items.

item_id and item_size each have the same definition as the parameter having the same name in the data asset management table. That is, the item_id (the item identifier) is a 32-bit value uniquely identifying the item on the stream, and the item_size indicates the size of the item in units of bytes.

file_name has the same definition as the parameter having the same name in the data directory management table. That is, file_name_byte indicates the byte length of a file name area, and the file name of the item is written into a series of areas including loops, the number of loops being equivalent to the byte length, in units of bytes (file_name_length).

item_checksum has the same definition as the parameter having the same name in the data asset management table. That is, the flag check_sum_flag indicating whether the checksum has been described, is set, and the item_checksum in 32 bits appears only in a case where 1 has been substituted for the flag, so that the checksum of the item is described.

item_type has the same definition as the parameter having the same name described in the MH-Type descriptor arranged in the item information (item_info) area in the data asset management table. That is, the byte length of an area in which the media type of the item is described, is described into item_type_length, and information regarding the media type of the file transported with the item, is described into text_char in a loop repeating by the byte length, in units of 8 bits.

compression_type and original_size each have the same definition as the parameter having the same name described in the MH-Compression Type descriptor arranged in the item information (item_info) area in the data asset management table. The MH-Compression Type descriptor itself is arranged in the item information area only in a case where the item to be transported has been compressed, and indicates the compression algorithm (compression_type) thereof and the byte size of the item (original_size) before the compression. In contrast to this, the compression_type and the original_size are necessarily described in the index_item regardless of whether the item has been compressed. In a case where the compression has not been performed, FF is specified to the compression_type.

Figure 20:
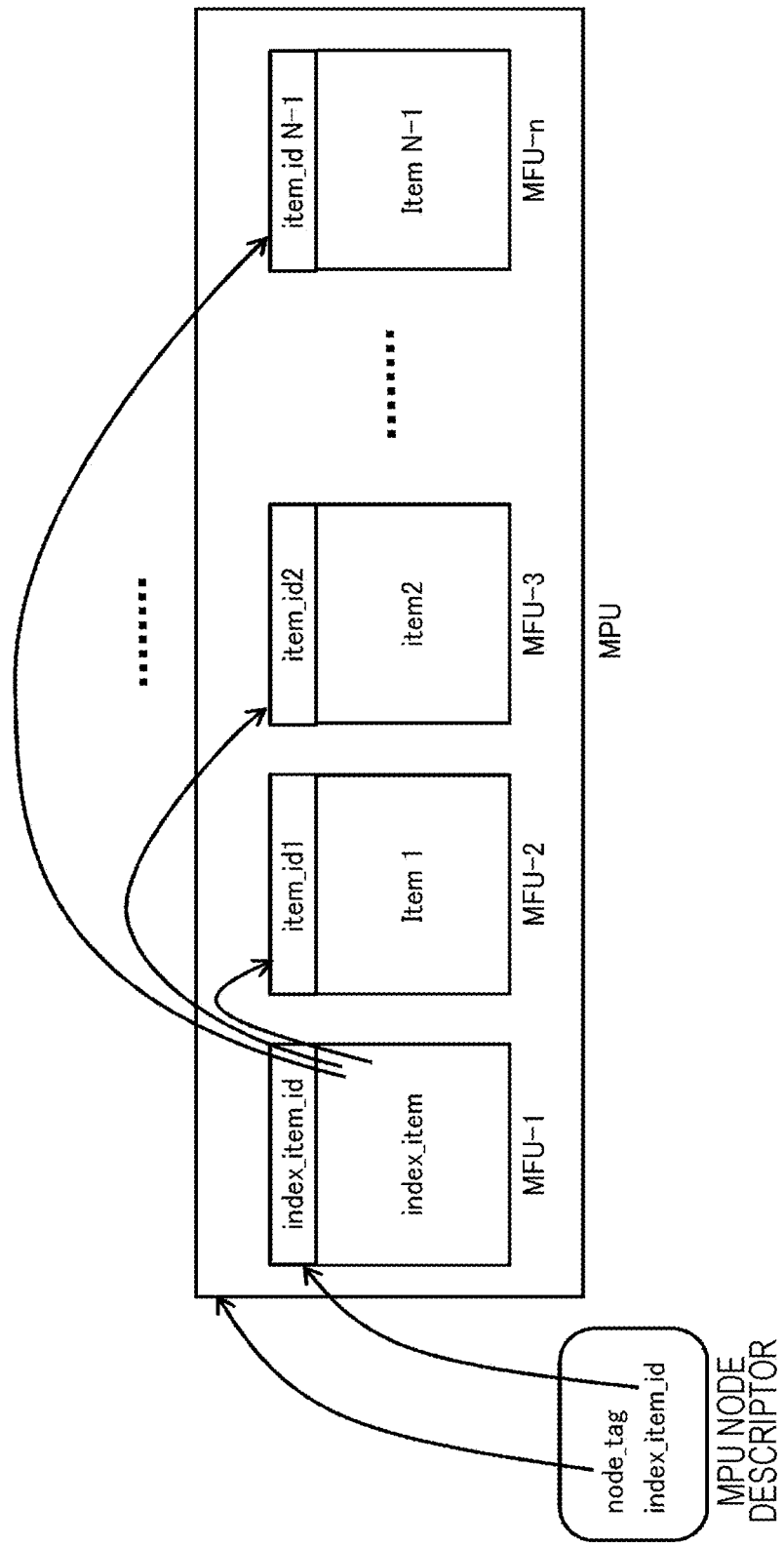
FIG. 20 is a diagram of a schematic exemplary configuration of an MPU including the index_item.

FIG. 20 schematically illustrates an exemplary configuration of the MPU including the index_item 1900.

An ordinary MPU transported with the data asset, includes a set of a plurality of MFUs individually storing the respective items corresponding to an application (an HTML5 document) that provides a multimedia service, and media files, such as image data, audio data, or text, used by the application.

In contrast to this, in the example illustrated in FIG. 20, an MFU-1 stores the index_item and the others MFU-2 to MFU-n individually store the items corresponding to the files under the directory. As described above, in a case where the MPU is made to agree with the directory, the description of the detailed information regarding the files under the corresponding directory is omitted in the data directory management table, and the description of the detailed information regarding the items under the corresponding MPU is omitted in the data asset management table. Then, the index_item file describing the detailed information regarding the items or files with the description omitted, is passed to one item in the MPU so as to be transported.

As described with reference to FIG. 12, the MPU node descriptor indicating that the MPU agrees with the directory, is arranged in the MPU information area 1202 in the data asset management table. Then, as described with reference to FIG. 18, the MPU node descriptor indicates whether the index_item is present in the MPU, with the index_item_exist_flag, and, in a case where the index_item is present, the item identifier of the index_item is indicated with the index_item_id or is made to the fixed item identifier. The MFU-1 stores the index_item in the example illustrated in FIG. 20. The DU header of the MFU-1 stores the index_item_id or the fixed item identifier specified by the MPU node descriptor.

In addition, as described with reference to FIG. 19, the index_item describes the detailed information per item and the detailed information per file with the descriptions omitted in the data asset management table and the data directory management table, such as the item identifier (item_id) of each item and the corresponding file name (file_name) on which the information is given in the item.

Therefore, when the index_item in the corresponding MPU is accessed on the basis of the MPU node descriptor in the data asset management table, sequentially the information in the index_item is analyzed to extract the item identifier corresponding to a desired file name, so that the corresponding item, namely, the MFU can be accessed.

Figure 21:
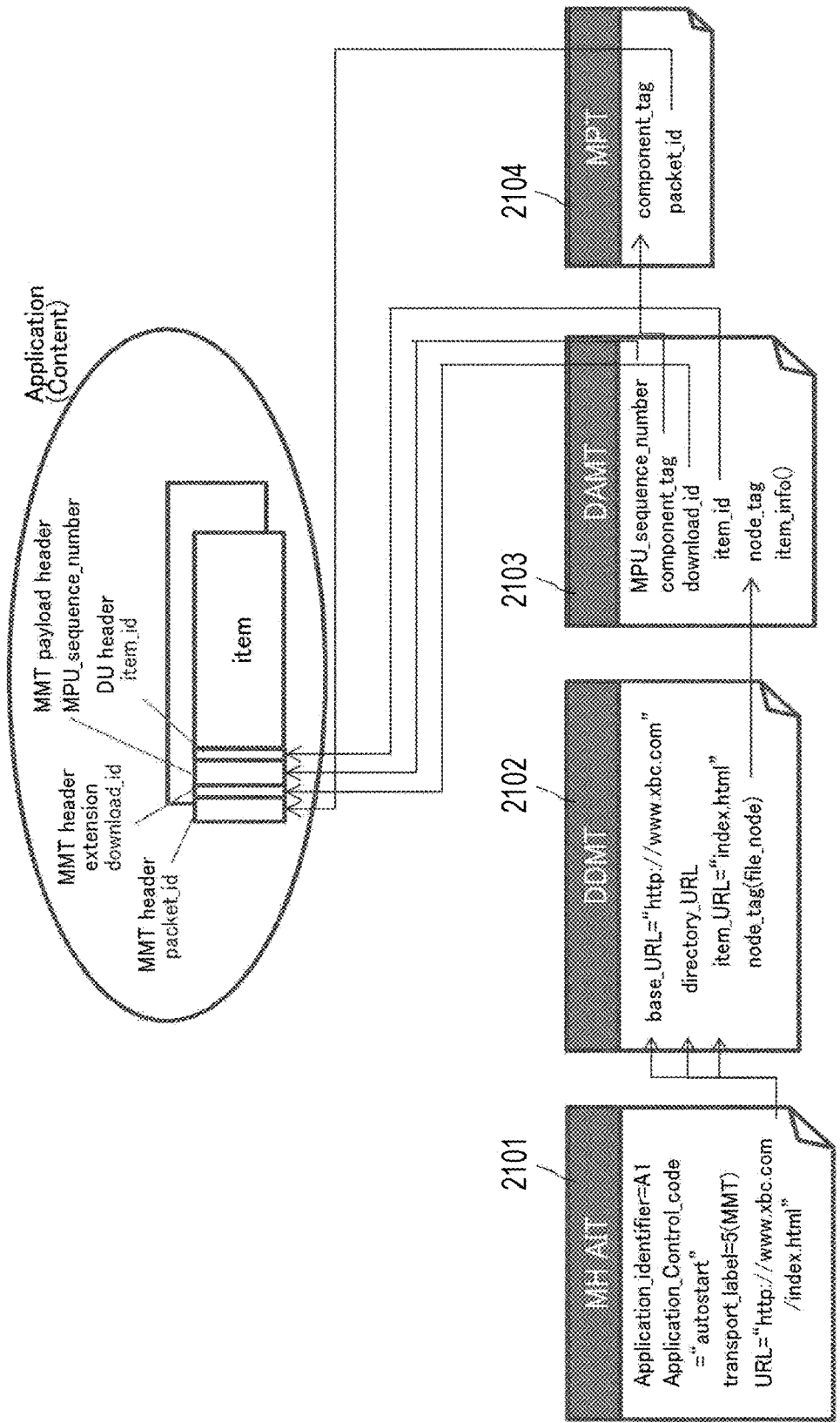
FIG. 21 is a diagram of the relationship between signaling tables in order to acquire an application (in a case where the index_item is not used).

FIG. 21 illustrates the relationship between the signaling tables, for acquiring an application. Note that, the figure assumes a case where the directory and the MPU disagree with each other or a case where the agreement is made but the index_item is not used. A procedure of acquiring the application in the case to be assumed, will be described below with reference to the figure.

When acquiring the MH-AI table 2101 with the M2 section message, the receiver 12 specifies the application in which the application_control_code has been specified to "autostart" (an autostart), from the application information loops. Then, with reference to the transport protocol descriptor arranged to the application, the receiver 12 checks whether the following expression has been satisfied: transport_protocol_label=5, namely, the MMT transport has been specified, so as to extract the URL information described in the selector byte in the descriptor.

Next, with reference to the data directory management table 2102 sent with the data transmission message, the receiver 12 acquires the node_tag of the item (the file node) agreeing with all the character strings of base_URL, directory_URL, and item_URL (file_name) in the URL information that has been extracted.

Next, with reference to the data asset management table 2103 sent with the data transmission message, the receiver 12 specifies the item having the node_tag (the file node) acquired in the data directory management table 2102, from the item loops in the MPU loops in each data component loop. Then, the MPU sequence number uniquely identifying the MPU to which the item belongs, the component tag (component_tag) identifying the data asset (the component) to which the MPU that transports the item belongs, and the download identifier (download_id) uniquely identifying the data content, are acquired.

Furthermore, when specifying the data asset specifying, with the MH stream identification descriptor, the same value as the component tag acquired in the data asset management table 2103, from the asset information loops (the second loops) in the MP table 2104 sent with the PA message, the receiver 12 acquires the packet identifier (packet_id) distinguishing the data asset, with reference to the MMT_general_location_info in the loop.

Then, the receiver 12 performs, on the IP data flow, filtering to a packet in which the MMTP header includes the packet identifier acquired in the MP table 2104 and the extension header of the MMTP header, the MMTP payload header, and the DU header include the download identifier, the MPU sequence number, and the item identifier acquired in the data asset management table 2103, respectively, so that the MFU that transports the file (the item) of the application specified to the autostart, can be extracted.

Figure 22:
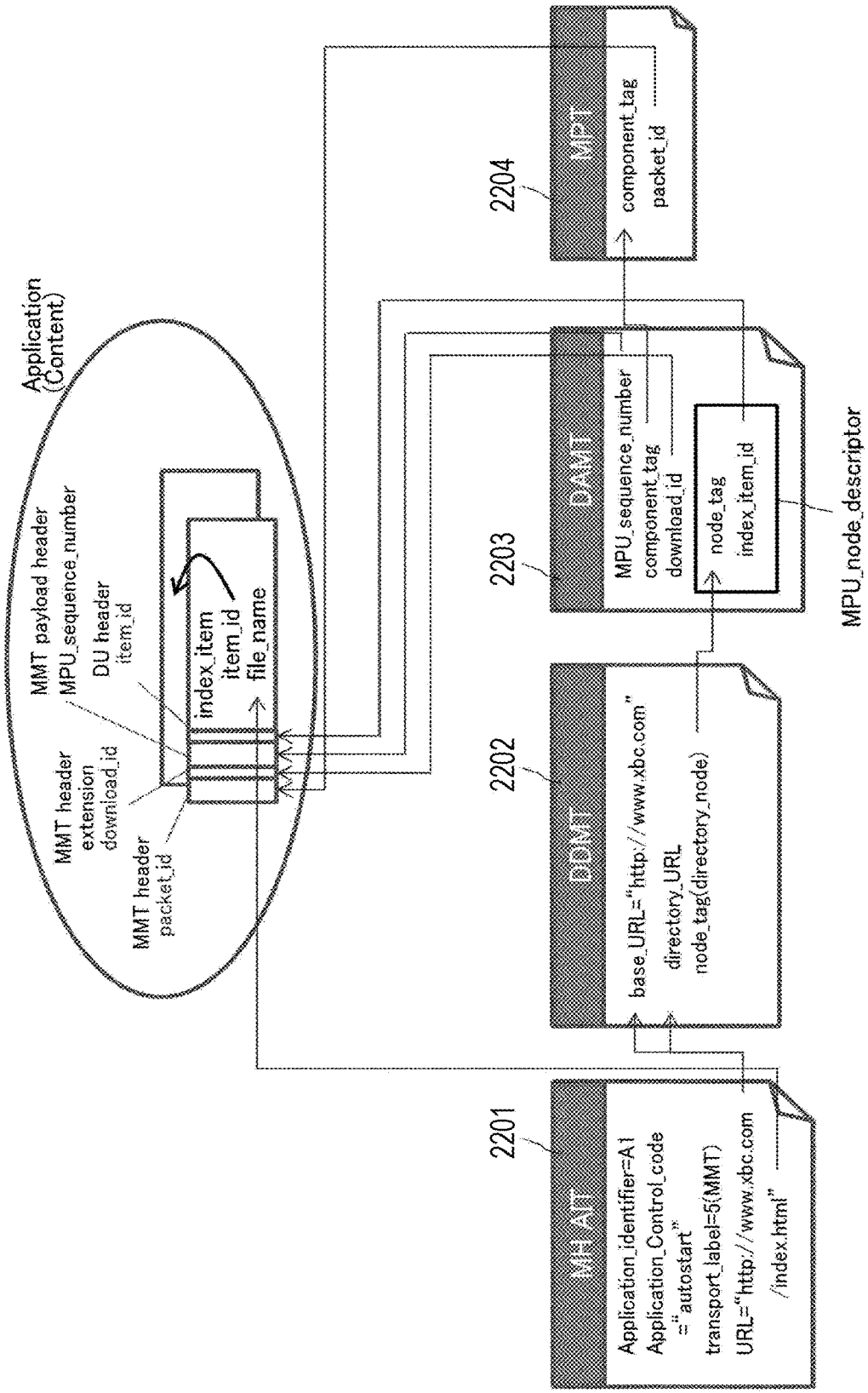
FIG. 22 is a diagram of the relationship between the signaling tables in order to acquire the application (in a case where the index_item is used).

In addition, FIG. 22 illustrates the relationship between the signaling tables, for acquiring the application. Note that, the figure assumes a case where the directory and the MPU agree with each other and the index_item is used. A procedure of acquiring the application in the case to be assumed, will be described below with reference to the figure.

When acquiring the MH-AI table 2201 with the M2 section message, the receiver 12 specifies the application specified to the autostart, from the application information loops. Then, with reference to the transport protocol descriptor arranged to the application, the receiver 12 checks whether the following expression has been satisfied: transport_protocol_label=5, namely, the MMT transport has been specified, so as to extract the URL information described in the selector byte in the descriptor (as described above).

Next, the receiver 12 specifies the directory agreeing with the base_URL and the directory_URL of the URL information that has been extracted, with reference to the data directory management table 2202 sent with the data transmission message, so as to acquire the node_tag of the directory.

Next, with reference to the data asset management table 2203 sent with the data transmission message, the receiver 12 specifies, from the MPU loops, the MPU agreeing with the directory, the MPU including the MPU node descriptor specifying the node_tag of the directory, arranged. Then, the item identifier (index_item_id) of the index_item is acquired from the MPU node descriptor (the fixed item identifier included). In addition, the receiver 12 acquires the MPU sequence number uniquely identifying the MPU, the component_tag (component_tag) identifying the data asset (the component) to which the MPU that transports the items belong, and the download identifier (download_id) uniquely identifying the data content, together.

Next, when specifying the data asset specifying, with the MH stream identification descriptor, the same value as the component_tag acquired in the data asset management table 2203, from the asset information loops (the second loops) in the MP table 2204 sent with the PA message, the receiver 12 acquires the packet identifier (packet_id) distinguishing the data asset, with reference to the MMT_general_location_info in the loop.

Next, the receiver 12 receives the MFUs (in other words, the files under the directory) belonging to the MPU agreeing with the directory, in the data asset identified with the packet identifier that has been acquired, so as to cache all the MFUs (into the multimedia cache 408). Specifically, filtering is performed to the MFUs belonging to the MPU agreeing with the directory, so as to cache all the packets in which the MMTP header includes the packet identifier acquired in the MP table 2204 and the extension header of the MMTP header and the MMTP payload header include the download identifier and the MPU sequence number acquired in the data asset management table 2203, respectively.

Next, the receiver 12 specifies the MFU including the index_item_id specified with the MPU node descriptor in the DU header, from the MPU that has been cached, so as to extract the main body of the index_item.

Next, the receiver 12 specifies the item_id of the item having the file name (file_name) agreeing with the character string of the item_URL extracted from the transport protocol descriptor (the selector byte) arranged to the desired application in the MH-AI table 2201, from the item loops of the index_item. Then, the MFU including the item_id in the DU header is extracted from the MPU that has been cached, so that the main body of the file (the item) of the application specified to the autostart, can be acquired.

Figure 23:
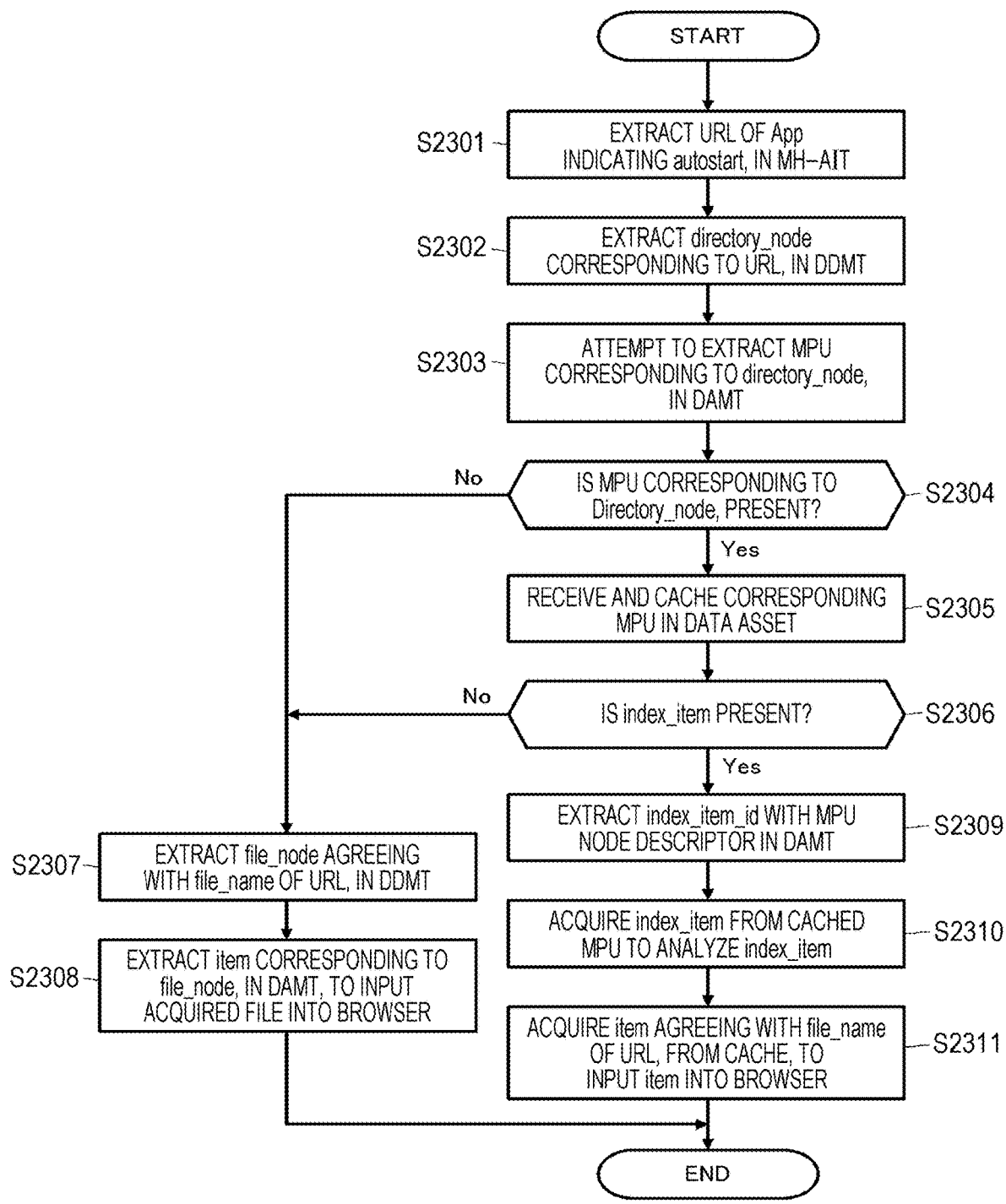
FIG. 23 is a flowchart of a processing procedure of starting the application.

FIG. 23 illustrates a processing procedure for starting the application in the receiver 12, in a flowchart format. The illustrated processing procedure all covers three cases including a case where the directory and the MPU do not agree with each other, a case where the directory and the MPU agree with each other but the index_item is not used (namely, a case where the transport amount of the data transmission message is not reduced), and a case where the directory and the MPU agree with each other and the index_item is used. In addition, the broadcast system control unit 410 mainly performs the illustrated processing procedure.

First, when acquiring the MH-AI table with the M2 section message, the receiver 12 specifies the application specified to the autostart (autostart) from the application information loops. Then, with respect to the transport protocol descriptor arranged to the application, the receiver 12 checks whether the following expression has been satisfied: transport_protocol_label=5, namely, the MMT transport has been specified, so as to extract the URL information described in the selector byte in the descriptor (step S2301).

Next, the receiver 12 specifies the directory agreeing with the base_URL and the directory_URL of the URL information that has been extracted, with reference to the data directory management table sent with the data transmission message, so as to acquire the node_tag of the directory (step S2302).

Next, the receiver 12 attempts to extract the MPU in which the MPU node descriptor specifies the node_tag of the directory acquired at step S2302 above, from the MPU loops in the data asset management table sent with the data transmission message (step S2303).

In a case where the MPU in which the MPU node descriptor specifies the node_tag of the directory, is present, namely in a case where the MPU agreeing with the directory is present (Yes at step S2304), the receiver 12 receives the MFUs belonging to the MPU agreeing with the directory (in other words, the files under the directory) in the data asset so as to cache all the MFUs (into the multimedia cache 408) (step S2305). Specifically, filtering is performed to packets in which the MMTP header includes the packet identifier acquired with the MP table and the extension header of the MMTP header and the MMTP payload header include the download identifier and the MPU sequence number acquired in the data as set management table, respectively, to cache all the packets.

Then, with reference to the index_item_exist_flag of the MPU node descriptor, the receiver 12 checks whether the value of the flag is 1, namely, the index_item is present (step S2306).

Here, in case where no MPU agreeing with the directory is present (No at step S2304) and in a case where no index_item is present (No at step S2306), the detailed information regarding the files and the detailed information regarding the items have been described in the data directory management table and the data asset management table, respectively. In this case, the receiver 12 extracts, from the data directory management table, the node_tag of the item agreeing with the character string of the item_URL in the URL information extracted at step S2301 above, namely, the file name (step S2307). Then, the receiver 12 specifies the item_id corresponding to the node_tag (the file node) extracted at step S2307, from the item loops in the data asset management table, and acquires the main body of the item (the file of the application specified to the autostart) so as to input the main body into the browser (the application engine 411) (step S2308).

Note that, in a case where the MPU is cached at step S2305, namely, in a case where the directory agrees with the MPU (Yes at step S2304), processing of extracting the MFU including the item_id that has been specified, in the DU header, from the MPU that has been cached, is performed at step S2308. On the other hand, in a case where the directory disagrees with the MPU (No at step S2304), processing of receiving the corresponding MFU from the data asset is performed at step S2308 in accordance with the procedure illustrated in FIG. 21.

Meanwhile, in a case where the MPU node descriptor satisfies the following expression: index_item_exist_flag=1, namely, the index_item is present (Yes at step S2306), the receiver 12 acquires the item identifier (index_item_id) of the index_item from the MPU node descriptor (the fixed item descriptor included) (step S2309).

Next, the receiver 12 specifies the MFU including the index_item_id acquired from the MPU node descriptor, in the DU header, from the MPU cached (in the multimedia cache 411) at step S2305 above, and then extracts the main body of the index_item so as to analyze the description thereof (step S2310).

Next, the receiver 12 specifies the item_id of the item having the file name (file_name) agreeing with the character string of the item_URL to the desired application, from the item loops of the index_item, and extracts the MFU including the item_id in the DU header, from the MPU that has been cached, so as to input the main body of the item (the file of the application specified to the autostart) into the browser (the application engine 411) (step S2311).

In this manner, the broadcast station (the broadcast output system 11) makes the directory and the MPU in agreement to perform the broadcast transport of the data content. Then, the detailed information regarding the files or items, is passed to the item in the data asset so as to be transported. Thus, the transport amount in the transport control signaling is reduced so that the band for transporting the data content (the application) can be ensured.

In addition, in a case where the broadcast transport of the data content is performed with the directory and the MPU in agreement, caching is performed to the MPU, namely, in the transport unit on the side of the receiver 12 so that the reception processing can be effectively performed to be useful.

E. Improvement of MMT Data Transport Control Signaling in Efficiency (2)

In Section D above, with the limitation to a case where the directory in the production of the content and the MPU being the transport unit of the broadcasting agree with each other, the technology of reducing the transport amount in the transport control signaling by passing the information regarding the files under the corresponding directory in the data directory management table and the information regarding the asset under the corresponding MPU in the data asset management table, to the index_item to perform the transport, has been described.

Even in a case where the directory in the production of the content and the MPU being the transport unit of the broadcasting disagree with each other, passing only information regarding at least apart of the items under the MPU in the data asset management table, to the index_item to perform the transport, can acquire the effect of reducing the transport amount in the transport control signaling with the limitation of reduction in information to the data asset management table.

FIG. 24 illustrates a different exemplary syntax of the data asset management table (DAMT) 2400. Differently from the exemplary syntax 1200 of the data asset management table (DAMT) illustrated in FIG. 12, there is provided a structure capable of specifying passing of the information regarding the items under the MPU to the index_item even in a case where the MPU disagrees with the directory in the production of the content. Each parameter of the data asset management table 2400 will be described below mainly with the difference from the exemplary syntax 1200 illustrated in FIG. 12.

Data component loops are arranged in the data asset management table 2400, the number of the data component loops being equivalent to the number_of_data_components specified with a parameter number_of_data_components (namely, the number of data assets included in the broadcast signal), so that information per data component is stored. In addition, MPU loops are arranged in each data component loop, the number of the MPU loops being equivalent to the number of mpus, included in the data component, specified with a parameter num_of_mpus.

Attribute information of the MPU, such as MPU_sequence_number, index_item_exist_flag, index_item_id_flag, and num_of_items, is specified in each MPU loop. The MPU_sequence_number is an MPU sequence number allocated to each MPU in the data component (the data asset), and the num_of_items indicates the number of items (file data) included in the MPU (as described above).

The index_item_exist_flag and the index_item_id_flag indicated with reference numerals 2401 and 2402, respectively, have the same definitions as the parameters having the same names in the MPU node descriptor 1800 illustrated in FIG. 18.

The index_item_exist_flag is a flag indicating whether the index_item is present. The following expression indicates that the index_item is present in the corresponding MPU of the data asset, namely, that the information regarding the items under the MPU is passed to the index_item: index_item_exist_flag=1. In this case, the description of the information regarding each item under the MPU, indicated with reference numeral 2404, is omitted in the MPU loop. Meanwhile, the following expression indicates that no index_item is present: index_item_exist_flag=0. In this case, the information regarding each item under the MPU, indicated with reference numeral 2404, is stored in the MPU loop.

In addition, the index_item_id_flag is a flag indicating whether the item identifier of the index_item is specified. The following expression indicates that the item identifier of the index_item is specified: index_item_id_flag=1, and an item identifier (index_item_id) for the index_item is specified, as indicated with reference numeral 2403, in an if statement including, as a condition, the logical conjunction with the following expression: index_item_exist_flag=1. Meanwhile, in a case where the following condition has been satisfied: index_item_exist_flag=1 and index_item_id=0, it is indicated that the index_item is present but the item identifier thereof is not specified (the index_item is a fixed item identifier).

Item loops are arranged, the number of the item loops being equivalent to the number of items specified with the num_of_items. The information regarding the items under the MPU agreeing with the directory, is passed to the index_item so as to be transported. Thus, even when the items are present under the MPU in practice, the num_of_items is set to 0 so that the information regarding the items under the MPU is not transported to the item loops (as described above).

In addition, regardless of whether the index_item is present, in an MPU loop disagreeing with the directory, the num_of_items specifies the number of actual items present under the MPU so that item loops are arranged, the number of the item loops being equivalent to a number indicated with the num_of_items. Note that, parameters, such as item_id, node_tag, item_size, item_version, item_checksum, and item_info, indicating the information per item, are arranged in an if statement indicated with reference numeral 2404. Therefore, only in a case where the following expression is satisfied: index_item_exist_flag=0, namely, no index_item is present, the parameters are arranged so as to be transported with the data asset management table. In a case where the following expression is satisfied: index_item_exist_flag=1, namely, the index_item is present, the parameters are transported with the index_item but are not transported with the data asset management table so that the transport amount can be reduced. Note that, the item_id, the node_tag, the item_size, the item_version, the item_checksum, and the item_info have the same definitions as the parameters having the same names illustrated in FIG. 12, and thus the descriptions thereof will be omitted here.

Information regarding each MPU is stored at the end of each MPU loop as indicated with reference numeral 2405. Specifically, MPU_info_length indicates the byte length of the subsequent MPU information area, and the information regarding the MPU is written into a series of areas including loops, the number of the loops being equivalent to the byte length, in units of bytes (item_info_byte). In a case where the MPU agrees with the directory, an MPU node descriptor is arranged in the MPU information area 2405. In other words, the MPU including the MPU node descriptor arranged indicates that the items used for the file transport under the directory have been only stored.

The MPU node descriptor indicates a node tag identifying the corresponding directory. Note that, the information regarding the index_item is specified in the main text of the data asset management table as indicated with reference numerals 2401 to 2403, and thus no specification is required with the MPU node descriptor. FIG. 25 illustrates an exemplary syntax of the MPU node descriptor 2500 used together with the data asset management table 2400 illustrated in FIG. 24. Differently from the MPU node descriptor 1800 illustrated in FIG. 18, the MPU node descriptor 2500 specifies only the node tag identifying the directory agreeing with the MPU.

In addition, FIG. 26 illustrates an exemplary syntax of the index_item 2600 used together with the data asset management table 2400 illustrated in FIG. 24. There is a similarity to the exemplary syntax 1900 illustrated in FIG. 19 in that num_of_items indicates the number of items on which the information is given with the index_item and the detailed information regarding each item or file is described in each item loop, the number of the item loops being equivalent to a number indicated with the num_of_items. There is only a difference in that a node tag (node_tag) indicated with reference numeral 2601 is included as the detailed information regarding each item.

The node tag 2601 has the same definition as the parameter having the same name arranged in each item loop 1201 in the data asset management table 1200 illustrated in FIG. 12. The node tag 2601 is a 16-bit value, as the node tag corresponding to the item, identifying the item, and corresponds to a node tag identifying the file transported with the item. According to the embodiment described in Section D, the detailed information 1101 relating to the files under the corresponding directory in the data directory management table, is omitted under a condition in which the directory and the MPU agree with each other. In contrast to this, according to the embodiment described in the present section, the detailed information 2404 on the items under the MPU may be omitted only for the data asset management table even in a case where the directory and the MPU disagree with each other. Therefore, the node tag of the file transported by each item is arranged in each item loop in the index_item so that collation with the information regarding the files in the data directory management table can be performed.

The configuration of the MPU including the index_item 2600 is similar to that of FIG. 20, and thus the description thereof will be omitted here.

Figure 27:
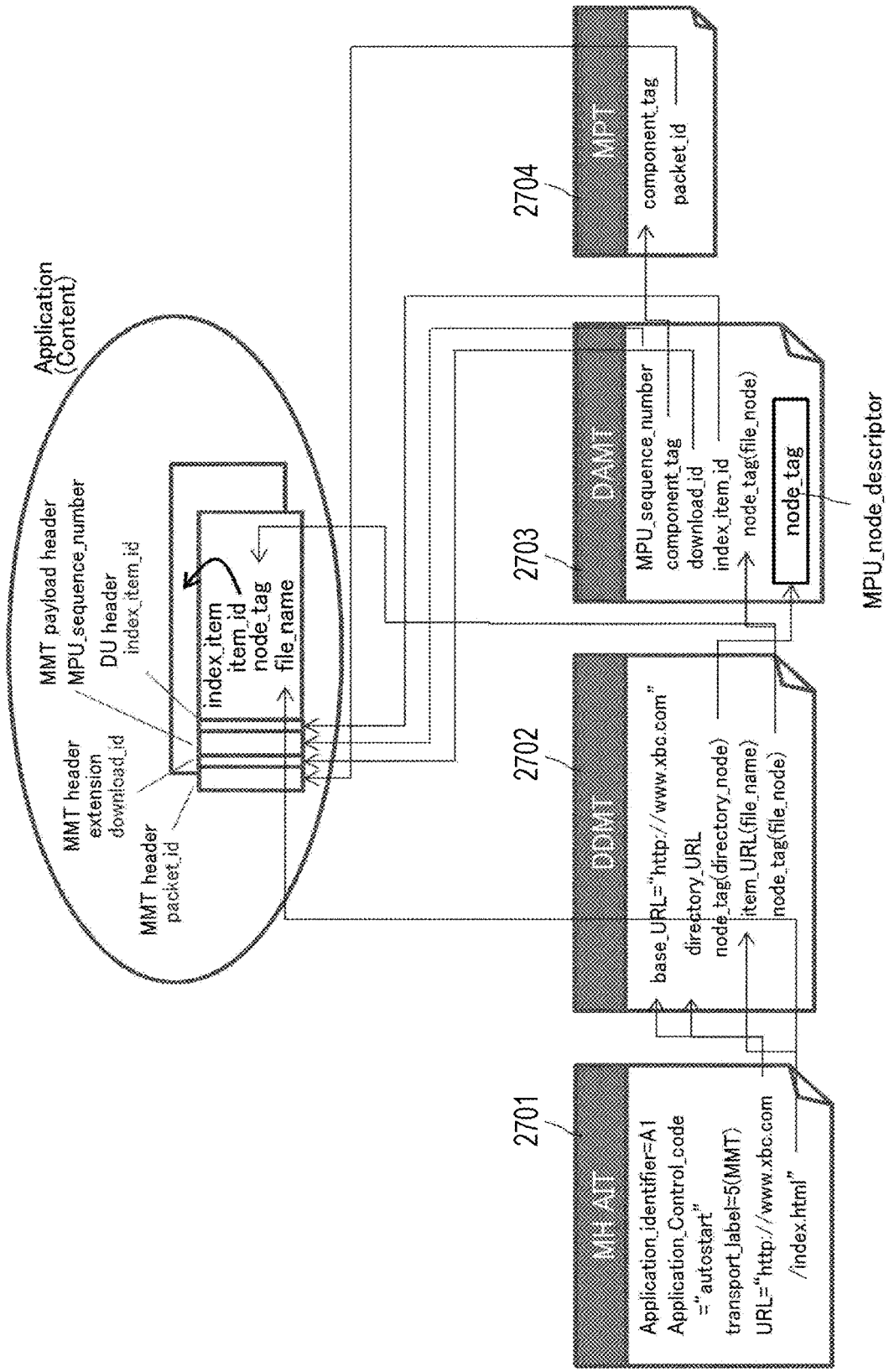
FIG. 27 is a diagram of the relationship between the signaling tables in order to acquire the application in a case where the data asset management table 2400 illustrated in FIG. 24 is used.

FIG. 27 illustrates the relationship between the signaling tables for acquiring the application in a case where the data asset management table 2400 illustrated in FIG. 24 is used. With reference to FIG. 27, a procedure of acquiring the application, will be described below in a case where the index_item 2600 is used.

When receiving the MH-AI table 2701 with the M2 section message, the receiver 12 specifies the application specified to the autostart from the application information loops. Then, with reference to the transport protocol descriptor arranged to the application, the receiver 12 checks whether the following expression has been satisfied: transport_protocol_label=5, namely, the MMT transport has been specified, so as to extract the URL information described in the selector byte in the descriptor (as described above).

Next, the receiver 12 specifies the directory agreeing with the base_URL and the directory_URL of the URL information that has been extracted, with reference to the data directory management table 2702 sent with the data transmission message, so as to acquire the node_tag of the directory.

Here, in a case where the following expression is specified to the corresponding directory in the data directory management table 2702: num_of_files=0, it is found that the directory agrees with the MPU. Therefore, with reference to the data asset management table 2703 sent with the data transmission message, the receiver 12 specifies, from the MPU loops, the MPU agreeing with the directory, the MPU including the MPU node descriptor specifying the node_tag of the directory, arranged. Then, the item identifier (index_item_id) of the index_item specified in the MPU loop including the MPU node descriptor arranged, is acquired (the fixed item identifier included).

Next, when specifying the data asset specifying, with the MH stream identification descriptor, the same value as the component tag acquired in the data asset management table 2703, from the asset information loops (the second loops) in the MP table 2704 sent with the PA message, the receiver 12 acquires the packet identifier (packet_id) distinguishing the data asset, with reference to the MMT_general_location_info in the loop.

Next, the receiver 12 receives the MFUs (in other words, the files under the directory) belonging to the MPU agreeing with the directory, in the data asset identified with the packet identifier that has been acquired, so as to cache all the MFUs (into the multimedia cache 408). Specifically, filtering is performed to the MFUs belonging to the MPU agreeing with the directory, so as to cache all packets in which the MMTP header includes the packet identifier acquired in the MP table 2704 and the extension header of the MMTP header and the MMTP payload header include the download identifier and the MPU sequence number acquired in the data asset management table 2703, respectively.

Next, the receiver 12 specifies the MFU including, in the DU header, the index_item_id specified to the corresponding MPU in the data asset management table 2703, from the MPU that has been cached, so as to extract the main body of the index_item.

Next, the receiver 12 specifies the item_id of the item having the filename (file_name) agreeing with the character string of the item_URL extracted from the transport protocol descriptor (the selector byte) arranged to the desired application in the MH-AI table 2701, from the item loops of the index_item. Then, the MFU including the item_id in the DU header is extracted from the MPU that has been cached, so that the main body of the file (the item) of the application specified to the autostart, can be acquired.

Meanwhile, the directory disagrees with the MPU in a case where an integer value of 1 or more is specified to the num_of_files of the corresponding directory in the data directory management table 2702, and thus it is found that the information regarding the files under the directory is specified in the data directory management table 2702. Therefore, the receiver 12 acquires the node_tag of the item agreeing with the entire URL character string leading to the item_URL (the file_name), with reference to the data directory management table 2702.

Next, with reference to the data asset management table 2703 sent with the data transmission message, the receiver 12 specifies the MPU to which an item belongs, the item having the node_tag (the file node) acquired in the data directory management table 2702, from the MPU loops in each data component loop.

Here, for the MPU including the index_item present (namely, the following expression is specified: index_item_exist_flag=1), the receiver 12 acquires the item identifier (index_item_id) of the index_item specified in the MPU loop (the fixed item identifier included).

Next, the receiver 12 acquires the MPU sequence number uniquely identifying the MPU, the component_tag (component_tag) identifying the data asset (the component) to which the MPU belongs, and the download identifier (download_id) uniquely identifying the data content, together.

Next, when specifying the data asset specifying, with the MH stream identification descriptor, the same value as the component_tag acquired in the data asset management table 2703, from the asset information loops (the second loops) in the MP table 2704 sent with the PA message, the receiver 12 acquires the packet identifier (packet_id) distinguishing the data asset, with reference to the MMT_general_location_info in the loop.

Next, the receiver 12 performs, on the IP data flow, filtering to a packet in which the MMTP header includes the packet identifier acquired in the MP table 2704 and the extension header of the MMTP header and the MMTP payload header include the download identifier and the MPU sequence number acquired in the data asset management table 2103, respectively, and the DU header includes the index_item_id acquired in the data asset management table 2704, so as to specify the MFU that transports the index_item, from the MPU, so that the main body of the index_item is extracted.

Then, when specifying the item identifier (item_id) of the item having the node_tag (the file node) acquired in the data directory management table 2702, from the item loops of the index_item that has been extracted, the receiver 12 extracts the MFU including the item_id in the DU header in the MPU, from the MPU that has been cached, so that the main body of the file (the item) of the application specified to the autostart can be acquired.

In addition, for the MPU including no index_item present (namely, the following expression is specified: index_item_exist_flag=0), the receiver 12 specifies the item having the node_tag (the file node) acquired in the data directory management table 2702, from the item loops included in the MPU loops in each data component loop, with reference to the data asset management table 2703. Then, the MPU sequence number uniquely identifying the MPU to which the item belongs, the component tag (component_tag) identifying the data asset (the component) to which the MPU that transports the item belongs, and the download identifier (download_id) uniquely identifying the data content, are acquired.

Furthermore, when specifying the data asset specifying, with the MH stream identification descriptor, the same value as the component tag acquired in the data asset management table 2703, from the asset information loops (the second loops) in the MP table 2104 sent with the PA message, the receiver 12 acquires the packet identifier (packet_id) distinguishing the data asset, with reference to the MMT_general_location_info in the loop.

Then, the receiver 12 performs, on the IP data flow, filtering to a packet in which the MMTP header includes the packet identifier acquired in the MP table 2704 and the extension header of the MMTP header, the MMTP payload header, and the DU header include the download identifier, the MPU sequence number, and the item identifier acquired in the data asset management table 2703, respectively, so that the MFU that transports the file (the item) of the application specified to the autostart, can be extracted.

Figure 28:
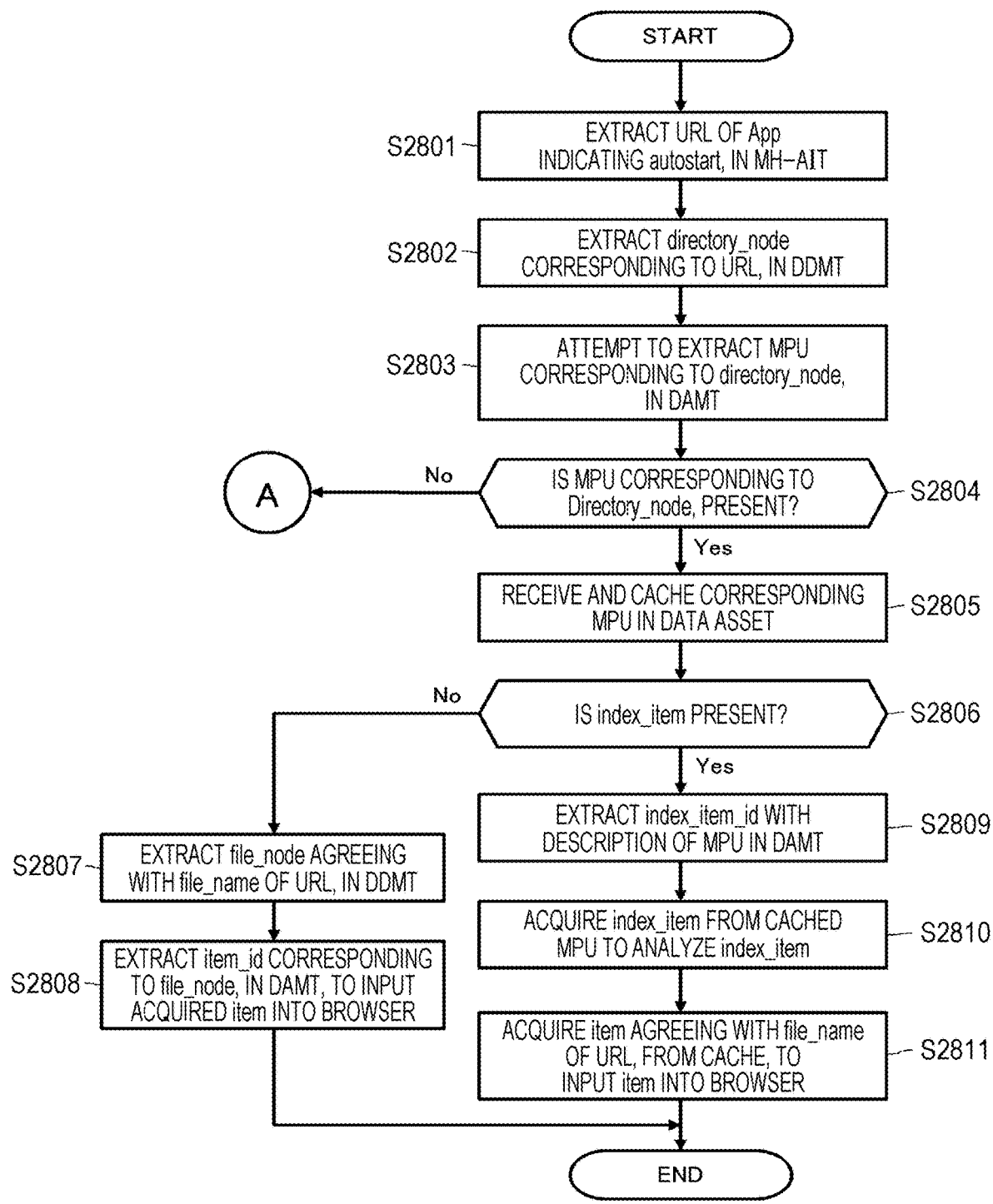
FIG. 28 is a flowchart of a processing procedure of starting the application with the data asset management table 2400 illustrated in FIG. 24.
Figure 29:
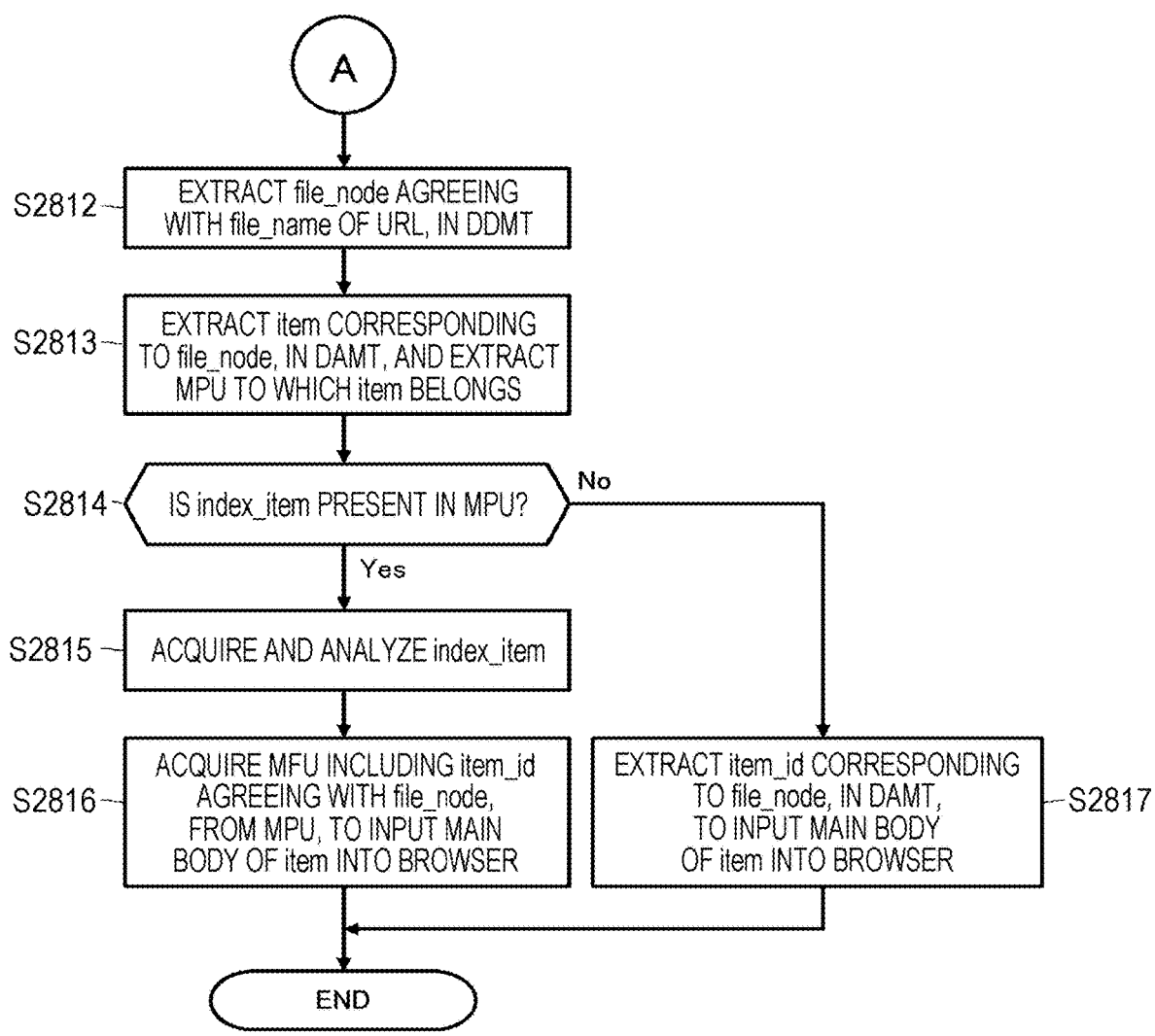
FIG. 29 is a flowchart of a processing procedure of starting the application with the data asset management table 2400 illustrated in FIG. 24.

FIGS. 28 and 29 illustrate, in a flowchart format, a processing procedure for starting the application with the data asset management table 2400 illustrated in FIG. 24, in the receiver 12. The broadcast system control unit 410 mainly performs the illustrated processing procedure.

First, when acquiring the MH-AI table with the M2 section message, the receiver 12 specifies the application specified to the autostart (autostart) from the application information loops. Then, with reference to the transport protocol descriptor arranged to the application, the receiver 12 checks whether the following expression has been satisfied: transport_protocol_label=5, namely, the MMT transport has been specified, so as to extract the URL information described in the selector byte in the descriptor (step S2801).

Next, with reference to the data directory management table sent with the data transmission message, the receiver 12 specifies the directory agreeing with the base_URL and the directory_URL in the URL information that has been extracted, so as to acquire the node_tag of the directory (step S2802).

Next, the receiver 12 attempts to extract the MPU in which the MPU node descriptor specifies the node_tag of the directory acquired at step S2802 above, from the MPU loops in the data asset management table sent with the data transmission message (step S2803).

Here, in a case where no MPU agreeing with the directory is present (No at step S2804), the node_tag of the item agreeing with the character string of the item_URL in the URL information extracted at step S2801 above, namely, the file name, is extracted from the data directory management table (step S2812).

Next, the receiver 12 specifies the MPU to which the item having the node_tag (the file node) acquired at step S2812 above, belongs, in the data asset management table (step S2813).

Here, in a case where the MPU includes the index_item present (namely, the following expression has been specified: index_item_exist_flag=1) (Yes at step S2814), the receiver 12 acquires and analyzes the index_item from the corresponding MPU in the data asset, on the basis of the item identifier (index_item_id) of the index_item specified in the MPU loop (step S2815).

Then, when acquiring the item identifier (item_id) of the item having the node_tag (the file node) acquired in the data directory management table, from the item loops of the index_item that has been extracted, the receiver 12 extracts the item from the MPU including the item identifier in the DU header, on the data asset, so as to input the main body of the item (the file of the application specified to the autostart) into the browser (the application engine 411) (step S2816).

In addition, in a case where no index_item is present in the MPU (namely, the following expression has been specified: index_item_exist_flag=0) (No at step S2814), when extracting the item_id corresponding to the node_tag (the file node) acquired at step S2812 above, from the data asset management table, the receiver 12 extracts the item from the MPU including the item identifier in the DU header, on the data asset, so as to input the main body of the item (the file of the application specified to the autostart) into the browser (the application engine 411) (step S2817).

Meanwhile, in a case where the MPU agreeing with the directory specified at step S2802 above is present (Yes at step S2804), the receiver 12 receives the MFUs (the files under the directory) belonging to the MPU agreeing with the directory, so as to cache all the MFUs (into the multimedia cache 408) (step S2805). Specifically, filtering is performed to packets in which the MMTP header includes the packet identifier acquired with the MP table and the extension header of the MMTP header and the MMTP payload header include the download identifier and the MPU sequence number acquired in the data asset management table, respectively, to cache all the packets.

Then, with reference to the index_item_exist_flag in the corresponding MPU loop in the data asset management table, the receiver 12 checks whether the value of the flag is 1, namely, the index_item is present (step S2806).

In a case where the following expression has been specified to the corresponding MPU: index_item_exist_flag=1, namely, in a case where the index_item is present (Yes at step S2806), the receiver 12 acquires the item identifier (index_item_id) of the index_item specified in the corresponding MPU loop in the data asset management table (the fixed item identifier included) (step S2809).

Next, the receiver 12 specifies the MFU including, into the DU header, the index_item_id acquired from the data asset management table, from the MPU cached (in the multimedia cache 411) at step S2805 above, and extracts the main body of the index_item so as to analyze the description thereof (step S2810).

Next, the receiver 12 specifies the item_id of the item having the file name (file_name) agreeing with the character string of the item_URL to the desired application, from the item loops of the index_item, and extracts the MFU including the item_id in the DU header, from the MPU that has been cached, so as to input the main body of the item (the file of the application specified to the autostart) into the browser (the application engine 411) (step S2811).

In addition, in a case where the following expression has been specified to the corresponding MPU: index_item_exist_flag=0, namely, no index_item is present (No at step S2806), the receiver 12 extracts, from the data directory management table, the node_tag of the item agreeing with the character string of the item_URL in the URL information extracted at step S2801 above, namely, the file name (step S2807). Then, when specifying the item_id corresponding to the node_tag (the file node) extracted at step S2807, from the item loops in the data asset management table, the receiver 12 acquires the main body of the item (the file of the application specified to the autostart) from the MFU including the item_id in the DU header, from the corresponding MPU in the data asset, so as to input the main body of the item into the browser (the application engine 411) (step S2808).

In this manner, the broadcast station (the broadcast output system 11) passes the detailed information regarding the items to be specified with the data asset management table, to the item in the data asset so as to perform the transport, so that the transport amount in the transport control signaling can be reduced and the band for transporting the data content (applications) can be ensured.

INDUSTRIAL APPLICABILITY

The technology disclosed in the present specification, has been described in detail above with reference to the specific embodiment. However, it is obvious that a person skilled in the art may make alterations or replacements to the embodiment without departing from the scope of the spirit of the technology disclosed in the present specification.

According to the present specification, the embodiment in which the technology disclosed in the present specification has been applied to the broadcast system including the media broadcasting adopting the MMT format, has been mainly described, but the spirit of the technology disclosed in the present specification is not limited to this. The technology disclosed in the present specification is applied in managing to make a directory configuration in content production agree with a transport unit, in various types of broadcast systems, so that the transport amount of transport control information of data broadcasting can be reduced and additionally a receiver can effectively receive the data broadcasting.

In other words, the technology disclosed in the present specification has been described with the mode including the exemplifications, and thus the details described in the present specification should not be interpreted in a limited way. The scope of the claims should be considered in order to judge the spirit of the technology disclosed in the present specification.

Note that, the technology disclosed in the present specification may have the following configurations.

(1) A transmission device includes:

a transmission unit configured to transmit a transport unit including a set of items used for file transport; and a control information transmission unit configured to transmit transport control information including a first table and a second table, the first table describing first information relating to files per directory, the second table describing second information relating to the items per transport unit.

In a case where the transmission unit transmits the transport unit agreeing with a directory, the control information transmission unit transmits the first table and the second table, the first table having omitted the first information under the directory agreeing with the transport unit, the second table having omitted the second information under the transport unit agreeing with the directory, and the transmission unit includes an index_item including a description relating to the first information and the second information that have been omitted, into the transport unit to perform the transmission.

(2) According to the transmission device described in (1) above, the control information transmission unit arranges a descriptor indicating that the transport unit agrees with the directory, into the second table to transmit the transport control information.

(3) According to the transmission device described in (2) above, the control information transmission unit transmits the descriptor specifying node identification information, whether the index item is present, and item identification information of the index item, the node identification information identifying the directory agreeing with the transport unit.

(4) According to the transmission device described in any of (1) to (3) above, the transmission unit transmits the index item including item identification information per item under the transport unit agreeing with the directory, associated with a file name of the file transported with each of the items.

(5) According to the transmission device described in (4) above, the transmission unit transmits the index item further including size information of each of the items.

(6) According to the transmission device described in (4) or (5) above, the transmission unit transmits the index item further including checksum information of each of the items.

(7) According to the transmission device described in any of (4) to (6) above, the transmission unit transmits the index item further including type identification information specifying a media type of the file transported with each of the items.

(8) According to the transmission device described in any of (4) to (7) above, the transmission unit transmits the index item further including compression identification information specifying a compression algorithm and an original size, the compression algorithm being applied to each of the items.

(9) A transmission method includes:

a transmission step of transmitting a transport unit including a set of items used for file transport; and a control information transmission step of transmitting transport control information including a first table and a second table, the first table describing first information relating to files per directory, the second table describing second information relating to the items per transport unit.

In a case where the transport unit agreeing with a directory is transmitted at the transmission step, the first table and the second table are transmitted at the control information transmission step, the first table having omitted the first information under the directory agreeing with the transport unit, the second table having omitted the second information under the transport unit agreeing with the directory, and an index item including a description relating to the first information and the second information that have been omitted, is included into the transport unit to perform the transmission, at the transmission step.

(10) A reception device includes:

a reception unit configured to receive a transport unit including a set of items used for file transport;

a control information reception unit configured to receive transport control information including a first table and a second table, the first table describing first information relating to files per directory, the second table describing second information relating to the items per transport unit; and a processing unit configured to process the files transported with the items, on the basis of the transport control information.

In a case where the transport unit agreeing with a directory is transported, the control information reception unit receives the first table and the second table, the first table having omitted the first information under the directory agreeing with the transport unit, the second table having omitted the second information under the transport unit agreeing with the directory, the reception unit receives the transport unit including an index item including a description relating to the first information and the second information that have been omitted, and the processing unit acquires the files on the basis of the description of the index item.

(11) According to the reception device described in (10) above, the processing unit caches, in entirety, the transport unit received by the reception unit, in response to the reception of the transport control information by the control information reception unit, the transport control information including a descriptor arranged in the second table, the descriptor indicating that the transport unit agrees with the directory.

(12) According to the reception device described in (11) above, the control information reception unit receives the descriptor specifying node identification information, whether the index item is present, and item identification information of the index item, the node identification information identifying the directory agreeing with the transport unit.

(13) According to the reception device described in (12) above, the processing unit acquires the index item on the basis of the item identification information specified by the descriptor from the transport unit received by the reception unit.

(14) According to the reception device described in any of (10) to (13) above, the reception unit receives the index item including item identification information per item under the transport unit agreeing with the directory, associated with a file name of the file transported with each of the items.

(15) According to the reception device described in (14) above, the processing unit specifies the item identification information used for the file transport, to acquire the item from the transport unit, on the basis of the index item.

(16) According to the reception device described in (14) or (15) above, the reception unit receives the index item further including size information of each of the items.

(17) According to the reception device described in any of (14) to (16) above, the reception unit receives the index item further including checksum information of each of the items.

(18) According to the reception device described in any of (14) to (17) above, the reception unit receives the index item further including type identification information specifying a media type of the file transported with each of the items.

(19) According to the reception device described in any of (14) to (18) above, the reception unit receives the index item further including compression identification information specifying a compression algorithm and an original size, the compression algorithm being applied to each of the items.

(20) A reception method includes:

a reception step of receiving a transport unit including a set of items used for file transport;

a control information reception step of receiving transport control information including a first table and a second table, the first table describing first information relating to files per directory, the second table describing second information relating to the items per transport unit; and a processing step of processing the files transported with the items on the basis of the transport control information.

In a case where the transport unit agreeing with a directory is transported, the first table and the second table are received at the control information reception step, the first table having omitted the first information under the directory agreeing with the transport unit, the second table having omitted the second information under the transport unit agreeing with the directory, the transport unit including an index item is received at the reception step, the index item including a description relating to the first information and the second information that have been omitted, and the files are acquired on the basis of the description of the index item at the processing step.

REFERENCE SINGS LIST

10 Digital broadcast system
11 Broadcast output system
12 Receiver
301 Clock unit
302 Signal output unit
303 Video encoder
304 Audio encoder
305 Subtitle/character super encoder
306 Signaling encoder
307 File encoder
308 Electronic data processing system
309 TLV signaling encoder
310 IP service multiplexer
311 TLV multiplexer
312 Modulation/transmission unit
401 Tuner/demodulation unit
402 MMT demultiplexer
403 Clock recovery unit
404 Video decoder
405 Audio decoder
406 Character super decoder
407 Subtitle decoder
408 Multimedia cache
409 SI cache
410 Broadcast system control unit
411 Application engine
412 Communication interface
414 Scaler
415 to 418 Composition unit

The invention claimed is:

1. A transmission device comprising:
a transmitter configured to
transmit a transport unit including a set of items used for file transport; and
transmit transport control information including a first table and a second table, the first table describing first information relating to files in a directory and the second table describing second information relating to the items in the transport unit,
wherein when the transport unit agrees with the directory, the first table omits the first information and the second table omits the second information, and
the transmitter inserts an index item including a description relating to the first information and the second information that have been omitted into the transport unit.

2. The transmission device according to claim 1, wherein the transmitter is further configured to arrange a descriptor indicating that the transport unit agrees with the directory into the second table.

3. The transmission device according to claim 2, wherein the transmitter is further configured to transmit the descriptor specifying node identification information, whether the index item is present, and item identification information of the index item, the node identification information identifying the directory agreeing with the transport unit.

4. The transmission device according to claim 1, wherein the transmitter transmits the index item including item identification information per item when the transport unit agrees with the directory, associated with a file name of the file transported with each of the items.

5. The transmission device according to claim 4, wherein the transmitter transmits the index item further including size information of each of the items.

6. The transmission device according to claim 4, wherein the transmitter transmits the index item further including checksum information of each of the items.

7. The transmission device according to claim 4, wherein the transmitter transmits the index item further including type identification information specifying a media type of the file transported with each of the items.

8. The transmission device according to claim 4, wherein the transmitter transmits the index item further including compression identification information specifying a compression algorithm and an original size, the compression algorithm being applied to each of the items.

9. A transmission method comprising:
transmitting a transport unit including a set of items used for file transport; and
transmitting transport control information including a first table and a second table, the first table describing first information relating to files in a directory, and the second table describing second information relating to the items in the transport unit,
wherein when the transport unit agrees with the directory, the first table omits the first information and the second table omits the second information, and
an index item including a description relating to the first information and the second information that have been omitted is inserted into the transport unit.

10. A reception device comprising:
a receiver configured to receive a transport unit including a set of items used for file transport and transport control information including a first table and a second table, the first table describing first information relating to files in a directory, the second table describing second information relating to the items in a transport unit; and
a processor configured to process the files transported with the items based on the transport control information, wherein when the transport unit agrees with the directory
the first table omits the first information and the second table omits the second information,
the transport unit includes an index item including a description relating to the first information and the second information that have been omitted, and
the processor acquires the files based on the description of the index item.

11. The reception device according to claim 10, wherein the processor is further configured to cache in entirety the transport unit, in response to the reception of the transport control information the transport control information including a descriptor arranged in the second table, the descriptor indicating that the transport unit agrees with the directory.

12. The reception device according to claim 11, wherein the receiver receives the descriptor specifying node identification information, whether the index item is present, and item identification information of the index item, the node identification information identifying the directory agreeing with the transport unit.

13. The reception device according to claim 12, wherein the processor is further configured to acquire the index item based on the item identification information specified by the descriptor from the transport unit.

14. The reception device according to claim 10, wherein the receiver receives the index item including item identification information per item, associated with a file name of a file transported with each of the items when the transport unit agrees with a directory.

15. The reception device according to claim 14, wherein the processor is further configured to specify the item identification information used for the file transport, and to acquire each item from the transport unit based on the index item.

16. The reception device according to claim 14, wherein the index item further includes size information of each of the items.

17. The reception device according to claim 14, wherein the index item further includes checksum information of each of the items.

18. The reception device according to claim 14, wherein the index item further includes type identification information specifying a media type of a file transported with each of the items.

19. The reception device according to claim 14, wherein the index item further includes compression identification information specifying a compression algorithm and an original size, the compression algorithm being applied to each of the items.

20. A reception method comprising:
receiving, using a receiver, a transport unit including a set of items used for file transport;
receiving transport control information including a first table and a second table, the first table describing first information relating to files in a directory, and the second table describing second information relating to the items in the transport unit;
processing the files transported with the items based on the transport control information,
wherein when the transport unit agrees with a directory,
the first table omits the first information and the second table omits the second information,
the transport unit including an index item is received, the index item including a description relating to the first information and the second information that have been omitted, and
the files are acquired based on the description of the index item.

* * * * *